United States Patent
Geng et al.

(10) Patent No.: US 12,550,033 B2
(45) Date of Patent: Feb. 10, 2026

(54) COMMUNICATION METHOD, APPARATUS, AND SYSTEM

(71) Applicant: HUAWEI TECHNOLOGIES CO., LTD., Guangdong (CN)

(72) Inventors: Tingting Geng, Shanghai (CN); Henrik Olofsson, Kista (SE); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 582 days.

(21) Appl. No.: 17/990,483

(22) Filed: Nov. 18, 2022

(65) Prior Publication Data
US 2023/0080142 A1  Mar. 16, 2023

Related U.S. Application Data

(63) Continuation of application No. PCT/CN2021/093550, filed on May 13, 2021.

(30) Foreign Application Priority Data

May 21, 2020 (CN) .......................... 202010438285.2

(51) Int. Cl.
*H04W 36/30* (2009.01)
*H04W 36/00* (2009.01)
*H04W 84/04* (2009.01)

(52) U.S. Cl.
CPC ..... *H04W 36/305* (2018.08); *H04W 36/0061* (2013.01); *H04W 36/0064* (2023.05); *H04W 84/042* (2013.01)

(58) Field of Classification Search
CPC ........... H04W 36/305; H04W 36/0061; H04W 36/0064; H04W 84/042; H04W 36/0083; H04W 24/02; H04W 36/0079
See application file for complete search history.

(56) References Cited

U.S. PATENT DOCUMENTS

| | | |
|---|---|---|
| 2015/0004975 A1 | 1/2015 | Yamamoto et al. |
| 2020/0100314 A1 | 3/2020 | Xu et al. |
| 2023/0086398 A1* | 3/2023 | Teyeb ................... H04W 76/19 |

FOREIGN PATENT DOCUMENTS

| | | |
|---|---|---|
| CN | 103179601 A | 6/2013 |
| CN | 103379517 A | 10/2013 |
| | (Continued) | |

OTHER PUBLICATIONS

Enhancement on RLF report for MRO, 3GPP TSG RAN WG2#109bis-e, R2-2002924, Electronic meeting, Apr. 20-30, 2020, 28 pages (Year: 2020).*

(Continued)

*Primary Examiner* — Jae Y Lee
*Assistant Examiner* — Nhu Pham
(74) *Attorney, Agent, or Firm* — Fish & Richardson P.C.

(57) ABSTRACT

Embodiments of this application provide a communication method, an apparatus, and a system. In one example method, after determining that a connection failure occurs, a terminal device records and sends a first report. The first report includes cell information of a first logical cell, or the first report includes a PLMN identifier of a first logical cell and cell information of a second logical cell. The first logical cell includes at least one of a source logical cell or a failed logical cell in which the connection failure occurs. The second logical cell includes at least one of a first logical cell that shares a same physical cell with the source logical cell or a first logical cell that shares a same physical cell with the failed logical cell.

20 Claims, 10 Drawing Sheets

(56) References Cited

FOREIGN PATENT DOCUMENTS

| | | |
|---|---|---|
| CN | 106376015 A | 2/2017 |
| EP | 3512247 A1 | 7/2019 |
| WO | 2018204863 A1 | 11/2018 |

OTHER PUBLICATIONS

ZTE Corporation et al., "Enhancement on RLF report for MRO," 3GPP TSG RAN WG2#109bis-e, R2-2002924, Electronic meeting, Apr. 20-30, 2020, 28 pages.
Mediatek Inc., "[M156] Need of RLF Report in NR," 3GPP TSG-RAN WG2 Meeting #103, R2-1811117, Gothenburg, Sweden, Aug. 20-24, 2018, 3 pages.
International Search Report and Written Opinion in International Appln. No. PCT/CN2021/093550, mailed on Aug. 20, 2021, 19 pages (with English translation).
Partial Supplementary European Search Report in European Appln No. 21808024.0, dated Sep. 1, 2023, 17 pages.

* cited by examiner

COMMUNICATION METHOD, APPARATUS, AND SYSTEM

CROSS-REFERENCE TO RELATED APPLICATIONS

This application is a continuation of International Application No. PCT/CN2021/093550, filed on May 13, 2021, which claims priority to Chinese Patent Application No. 202010438285.2, filed on May 21, 2020. The disclosures of the aforementioned applications are hereby incorporated by reference in their entireties.

TECHNICAL FIELD

This application relates to the communications field, and in particular, to a communication method, an apparatus, and a system.

BACKGROUND

In a mobility robustness optimization (MRO) mechanism, a terminal device may record and report a radio link failure (RLF) report. The RLF report may include information about a related cell involved in a connection failure process, so that an access network device to which the related cell belongs can better identify, based on the RLF report, a configuration problem of a mobility-related parameter of the related cell, and optimize the mobility-related parameter in a timely manner, to reduce a connection failure rate of the terminal device and improve a handover success rate.

Radio access network (RAN) sharing means that one physical cell may be shared with a plurality of networks. Usually, one physical cell is shared with a plurality of logical cells, and different logical cells may belong to different public land mobile networks (PLMNs) and/or different non-public networks (NPNs). The physical cell shared with the plurality of logical cells is also referred to as a shared cell, and the plurality of logical cells may be referred to as a plurality of logical cells of the shared cell. The physical cell may be understood as a cell corresponding to a physical resource, and for example, may be identified by a frequency and a physical cell identifier (PCI). The logical cell may be identified by a cell global identifier (CGI). To be specific, the logical cell may be a cell identified by a CGI. The CGI includes a PLMN identifier and a cell identifier (cell ID).

In addition, in the plurality of logical cells of the shared cell, a part or all of different logical cells may belong to different access network devices, that is, the different logical cells are managed by the different access network devices. In this scenario, when a connection failure occurs in the shared cell or the shared cell is a source cell related to a connection failure, how the terminal device records the RLF report, to enable the RLF report to be used to optimize a configuration of the mobility-related parameter is an urgent problem to be currently resolved.

SUMMARY

Embodiments of this application provide a communication method, an apparatus, and a system, to properly record an RLF report, so that the RLF report can be used to optimize a configuration of a mobility-related parameter. Therefore, a connection failure rate of a terminal device is reduced, and a handover success rate is improved.

To achieve the foregoing objectives, the following technical solutions are used in embodiments of this application.

According to a first aspect, a communication method is provided. The method may be performed by a terminal device, or may be performed by a component of the terminal device, for example, a processor, a circuit, a chip, or a chip system of the terminal device. In this application, an example in which the method is performed by the terminal device is used for description. The method includes: A terminal determines that a connection failure occurs, and records a first report. The first report includes cell information of a first logical cell, or the first report includes a public land mobile network PLMN identifier of a first logical cell and cell information of a second logical cell. The first logical cell includes a source logical cell and/or a failed logical cell in which the connection failure occurs. When the first logical cell includes the source logical cell, the second logical cell includes a $1^{st}$ logical cell that shares a same physical cell with the source logical cell. When the first logical cell includes the failed logical cell, the second logical cell includes a $1^{st}$ logical cell that shares a same physical cell with the failed logical cell. The terminal device sends the first report.

Based on this solution, a connection failure rate of the terminal device in a RAN sharing scenario can be reduced, and a handover success rate can be improved. For example, because the first report includes cell information of the source logical cell and/or cell information of the failed logical cell, when an access network device that receives the first report from the terminal device is a third access network device, the third access network device may send, based on the cell information of the source logical cell and/or the cell information of the failed logical cell, the first report to an access network device to which the source logical cell belongs and/or an access network device to which the failed logical cell belongs, so that the access network devices optimize a mobility-related parameter, to reduce the connection failure rate of the terminal device, and improve the handover success rate. Alternatively, because the first report includes a PLMN identifier of the source logical cell and/or a PLMN identifier of the failed logical cell, and the cell information of the second logical cell, when an access network device that receives the first report from the terminal device is a third access network device, the third access network device may first send, based on the cell information of the second logical cell, the first report to an access network device to which the second logical cell belongs, so that the access network device to which the second logical cell belongs determines the corresponding cell information of the first logical cell based on the PLMN identifier of the first logical cell, for example, based on the PLMN identifier of the first logical cell and a stored cell information list, and determines, based on the cell information of the first logical cell, an access network device to which the first logical cell belongs. Alternatively, when the first report includes the cell information of the second logical cell and the cell information of the first logical cell, an access network device to which the second logical cell belongs may determine, based on the cell information that is included in the first report and that is of the first logical cell, an access network device to which the first logical cell belongs, and sends the first report to the access network device to which the first logical cell belongs, so that the access network device to which the first logical cell belongs optimizes a mobility-related parameter, to reduce the connection failure rate of the terminal device, and improve the handover success rate.

In some possible designs, the cell information includes a PLMN identifier and cell identifier information, and the cell identifier information is used to identify a cell.

In some possible designs, the source logical cell is a logical cell in which the terminal device is located when the terminal device last receives a handover command.

In some possible designs, the connection failure is a radio link failure RLF, and the failed logical cell is a logical cell in which the RLF is detected.

In some possible designs, the connection failure is a handover failure HOF, and the failed logical cell is a target logical cell in which the HOF occurs.

In some possible designs, when the first report includes the cell information of the second logical cell, the first report further includes cell identifier information of the first logical cell. When the first report includes the cell information of the second logical cell, the first report simultaneously includes the PLMN identifier of the first logical cell. Therefore, in this case, that the first report further includes cell identifier information of the first logical cell is that the first report includes the cell information of the first logical cell and the cell information of the second logical cell, so that flexibility of transmitting the first report can be improved. For example, an access network device that receives the first report from the terminal device may send the first report to the access network device to which the first logical cell belongs or the access network device to which the second logical cell belongs.

In some possible designs, when the first logical cell includes the source logical cell, the method further includes: The terminal device receives first indication information. The first indication information indicates the terminal device to record cell information or a PLMN identifier of the source logical cell. In this case, that the terminal device records a first report may include: The terminal device records the first report based on the first indication information.

In some possible designs, when the first logical cell includes the failed logical cell, the method further includes: The terminal device receives second indication information. The second indication information indicates the terminal device to record cell information or a PLMN identifier of the failed logical cell. In this case, that the terminal device records a first report may include: The terminal device records the first report based on the second indication information.

According to a second aspect, a communication method is provided. The method may be performed by an access network device, or may be performed by a component of the access network device, for example, a processor, a circuit, a chip, or a chip system of the access network device. The access network device may be a first access network device, a second access network device, or a third access network device. The first access network device is an access network device to which a source logical cell belongs, the second access network device is an access network device to which a failed logical cell belongs, and the third access network device is an access network device that receives a first report from a terminal device. In this application, an example in which the method is performed by the first access network device is used for description. The method includes. A first access network device receives a first report. The first report includes cell information of a first logical cell, or the first report includes a public land mobile network PLMN identifier of a first logical cell and cell information of a second logical cell. The first logical cell includes a source logical cell and/or a failed logical cell in which a connection failure occurs. When the first logical cell includes the source logical cell, the second logical cell includes a $1^{st}$ logical cell that shares a same physical cell with the source logical cell. When the first logical cell includes the failed logical cell, the second logical cell includes a $1^{st}$ logical cell that shares a same physical cell with the failed logical cell. The first access network device processes the first report.

Based on this solution, a connection failure rate of a terminal device in a RAN sharing scenario can be reduced, and a handover success rate can be improved. For example, because the first report may include cell information of the source logical cell, when an access network device that receives the first report from the terminal device is a third access network device, the third access network device may send, based on the cell information of the source logical cell, the first report to an access network device to which the source logical cell belongs, so that the access network device to which the source logical cell belongs optimizes a mobility-related parameter, to reduce the connection failure rate of the terminal device, and improve the handover success rate. Alternatively, because the first report includes a PLMN identifier of the source logical cell and the cell information of the second logical cell, when an access network device that receives the first report from the terminal device is a third access network device, the third access network device may first send, based on the cell information of the second logical cell, the first report to an access network device to which the second logical cell belongs, so that the access network device to which the second logical cell belongs determines the corresponding cell information of the source logical cell based on the PLMN identifier of the source logical cell, for example, based on the PLMN identifier of the source logical cell and a stored cell information list, and determines, based on the cell information of the source logical cell, an access network device to which the source logical cell belongs. Alternatively, when the first report includes the cell information of the second logical cell and the first logical cell, an access network device to which the second logical cell belongs may determine, based on the cell information that is included in the first report and that is of the source logical cell, an access network device to which the source logical cell belongs, and sends the first report to the access network device to which the source logical cell belongs, so that the access network device to which the source logical cell belongs optimizes a mobility-related parameter, to reduce the connection failure rate of the terminal device, and improve the handover success rate.

In some possible designs, the cell information includes a PLMN identifier and cell identifier information, and the cell identifier information is used to identify a cell.

In some possible designs, the source logical cell is a logical cell in which the terminal device is located when the terminal device last receives a handover command.

In some possible designs, the connection failure is a radio link failure RLF, and the failed logical cell is a logical cell in which the RLF is detected.

In some possible designs, the connection failure is a handover failure HOF, and the failed logical cell is a target logical cell in which the HOF occurs.

In some possible designs, the method further includes: The first access network device obtains indication information. The indication information includes first indication information and/or second indication information. The first indication information indicates the terminal device to record cell information or a public land mobile network PLMN identifier of the source logical cell when the connection failure occurs. The second indication information indicates the terminal device to record cell information or a PLMN identifier of the failed logical cell in which the connection failure occurs. The first access network device is the access network device to which the source logical cell belongs. The first access network device sends the indication information, for example, sends the indication information to the terminal device.

Based on this solution, because the first access network device sends the indication information to the terminal device, the terminal device may record the first report based on the indication information when the connection failure occurs. For example, the first report includes the cell information of the first logical cell, or includes the PLMN identifier of the first logical cell and the cell information of the second logical cell, so that the first report can be finally sent to the access network device to which the source logical cell belongs and/or an access network device to which the failed logical cell belongs. Therefore, the access network devices optimize a mobility-related parameter, to reduce the connection failure rate of the terminal device, and improve the handover success rate.

In some possible designs, when the indication information includes the second indication information, that the first access network device obtains indication information may include: The first access network device receives the second indication information from a second access network device. The second access network device is an access network device to which the failed logical cell belongs.

According to a third aspect, a communication method is provided. The method may be performed by an access network device, or may be performed by a component of the access network device, for example, a processor, a circuit, a chip, or a chip system of the access network device. In this application, an example in which the method is performed by the access network device, and the access network device is a first CU is used for description. The first CU is a CU to which a $1^{st}$ logical cell of a source cell belongs. The method includes: A first CU receives a first report. The first report is used to record a case in which a connection failure occurs in a terminal device. The first CU obtains a cell radio network temporary identifier C-RNTI of the terminal device in a source logical cell. When the first CU determines, based on the C-RNTI of the terminal device in the source logical cell, that the terminal device is not a terminal device managed by the first CU, the first CU sends the first report.

Based on this solution, a connection failure rate of the terminal device can be reduced, and a handover success rate can be improved. For example, when the first CU determines that the terminal device is not a terminal device managed by the first CU, if the first CU can determine a third CU to which the source logical cell belongs, the first CU may send the first report to the third CU, that is, transmit the first report to a CU to which the source logical cell belongs, so that the third CU optimizes a mobility-related parameter of the terminal device, to further reduce the connection failure rate of the terminal device and improve the handover success rate. Alternatively, if the first CU cannot determine a third CU to which the source logical cell belongs, the first CU may send the first report to a fourth CU, where the fourth CU is another CU that shares a same DU with the third CU. It may be understood that the fourth CU includes a CU (namely, the third CU) to which the source logical cell belongs. In other words, in this method, the first report may alternatively be transmitted to the CU to which the source logical cell belongs, so that the third CU optimizes a mobility-related parameter of the terminal device, to further reduce the connection failure rate of the terminal device and improve the handover success rate. Alternatively, if the first CU cannot determine a third CU to which the source logical cell belongs, the first CU may send the first report to a DU, where the DU is a DU shared by the first CU and a fourth CU. The DU sends the first report to the third CU or the fourth CU, to transmit the first report to a CU to which the source logical cell belongs, so that the third CU optimizes a mobility-related parameter of the terminal device, to further reduce the connection failure rate of the terminal device and improve the handover success rate.

In some possible designs, in a scenario in which a type of the connection failure is an HOF, that the first CU obtains a C-RNTI of the terminal device in a source logical cell may be: The first CU obtains the C-RNTI that is included in the first report and that is of the terminal device in the source logical cell. That is, the first report includes the C-RNTI of the terminal device in the source logical cell.

In some possible designs, in an RLF scenario of a premature handover or a wrong handover, that the first CU obtains a C-RNTI of the terminal device in a source logical cell may be: The first CU receives, from a CU to which a failed logical cell belongs, the C-RNTI of the terminal device in the source logical cell.

It may be understood that, in a scenario in which a type of the connection failure is an RLF, a method in which a CU (which is referred to as a second CU) to which a $1^{st}$ logical cell of a failed cell belongs receives and processes the first report is similar to the method in the third aspect. A difference lies in that the first report includes a C-RNTI of the terminal device in the failed logical cell, the second CU determines, based on the C-RNTI of the terminal device in the failed logical cell, that the terminal device is not a terminal device managed by the second CU, and the first report may be sent to the CU to which the failed logical cell belongs.

In some possible designs, in the RLF scenario of a premature handover or a wrong handover, after receiving the first report, the CU to which the failed logical cell belongs may send the first report to the first CU. In this scenario, because the first report includes the C-RNTI of the terminal device in the failed logical cell, to enable the first CU to send the first report to the CU to which the source logical cell belongs, when sending the first report, the CU to which the failed logical cell belongs may simultaneously send, to the first CU, the C-RNTI of the terminal device in the source logical cell, so that the first CU performs the method in the third aspect based on the C-RNTI of the terminal device in the source logical cell.

It may be understood that the methods in the foregoing aspects are applicable to a scenario in which different logical cells belong to different access network devices during RAN sharing, but shall not constitute any limitation on this application.

According to a fourth aspect, a communication apparatus is provided, and is configured to implement any one of the methods in the foregoing aspects. In some implementations, the communication apparatus may be the terminal device in the first aspect, an apparatus including the terminal device, or an apparatus included in the terminal device, for example, a chip. Alternatively, in some other implementations, the communication apparatus may be the access network device in the second aspect or the third aspect, an apparatus including the access network device, or an apparatus included in the access network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fifth aspect, a communication apparatus is provided, and includes a memory and at least one processor. The memory is configured to store computer instructions. When the processor executes the instructions, the communication apparatus is enabled to perform the method in any one of the foregoing aspects. The communication apparatus may be the terminal device in the first aspect, an apparatus including the terminal device, or an apparatus included in the terminal device, for example, a chip. Alternatively, the communication apparatus may be the access network device in the second aspect or the third aspect, an apparatus including the access network device, or an apparatus included in the access network device.

According to a sixth aspect, a communication apparatus is provided, including an interface circuit and at least one processor. The interface circuit may be a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. The processor is configured to run the computer-executable instructions to perform the method in any one of the foregoing aspects. The communication apparatus may be the terminal device in the first aspect, an apparatus including the terminal device, or an apparatus included in the terminal device, for example, a chip. Alternatively, the communication apparatus may be the access network device in the second aspect or the third aspect, an apparatus including the access network device, or an apparatus included in the access network device.

According to a seventh aspect, a communication apparatus is provided, and includes at least one processor. The processor is configured to be coupled to a memory, and perform, after reading instructions in the memory, the method in any one of the foregoing aspects according to the instructions. The communication apparatus may be the terminal device in the first aspect, an apparatus including the terminal device, or an apparatus included in the terminal device, for example, a chip. Alternatively, the communication apparatus may be the access network device in the second aspect or the third aspect, an apparatus including the access network device, or an apparatus included in the access network device.

According to an eighth aspect, a computer-readable storage medium is provided. The computer-readable storage medium stores instructions. When the instructions are run on a communication apparatus, the communication apparatus is enabled to perform the method in any one of the foregoing aspects. The communication apparatus may be the terminal device in the first aspect, an apparatus including the terminal device, or an apparatus included in the terminal device, for example, a chip. Alternatively, the communication apparatus may be the access network device in the second aspect or the third aspect, an apparatus including the access network device, or an apparatus included in the access network device.

According to a ninth aspect, a computer program product including instructions is provided. When the computer program product runs on a communication apparatus, the communication apparatus is enabled to perform the method in any one of the foregoing aspects. The communication apparatus may be the terminal device in the first aspect, an apparatus including the terminal device, or an apparatus included in the terminal device, for example, a chip. Alternatively, the communication apparatus may be the access network device in the second aspect or the third aspect, an apparatus including the access network device, or an apparatus included in the access network device.

According to a tenth aspect, a communication apparatus (where for example, the communication apparatus may be a chip or a chip system) is provided. The communication apparatus includes at least one processor, configured to implement a function in any one of the foregoing aspects. In a possible design, the communication apparatus further includes a memory. The memory is configured to store program instructions and/or data that are necessary. When the communication apparatus is a chip system, the communication apparatus may include a chip, or may include a chip and another discrete component.

For a technical effect brought by any design manner in the fourth aspect to the tenth aspect, refer to technical effects brought by different design manners in the first aspect, the second aspect, or the third aspect. Details are not described herein again.

According to an eleventh aspect, a communication system is provided. The communication system includes the terminal device in the foregoing aspects and the access network device in the foregoing aspects.

DESCRIPTION OF EMBODIMENTS

Figure 1A:
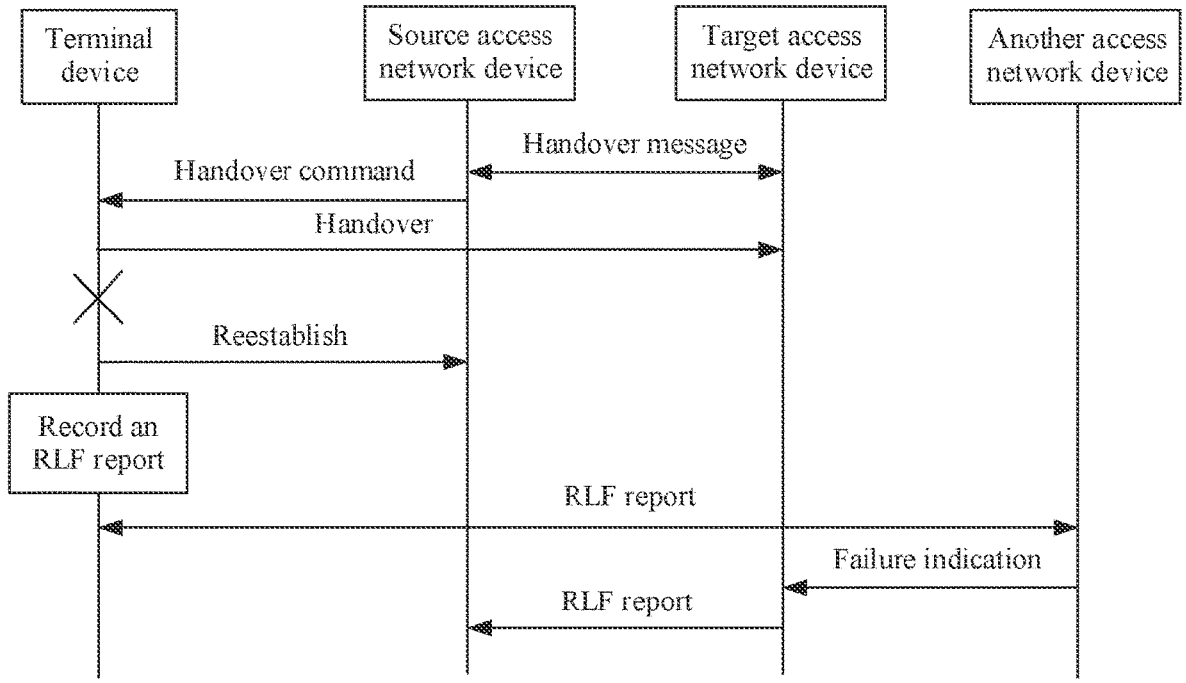
FIG. 1a is a schematic diagram 1 of existing transmission of an RLF report.

For ease of understanding of the technical solutions in embodiments of this application, the technologies related to this application are first briefly described as follows.

1. Radio Link Failure (RLF) Report:

To avoid a connection failure caused by an improper handover parameter configured by a network, an MRO mechanism is separately introduced to a long term evolution (LTE) system and anew radio (NR) system. In the MRO mechanism, a terminal device records a parameter in a mobility failure process, and reports the parameter to the network. In this way, an access network device can better identify a configuration problem of a mobility parameter of the terminal device, and optimize a mobility-related parameter in a timely manner, to reduce a connection failure rate of the terminal device and improve a handover success rate. It may be understood that the connection failure includes an RLF or a handover failure (HOF).

A report recorded in the existing MRO mechanism may be referred to as the RLF report, and includes at least one of the following parameters:

(1) Failed cell information (failedPcellID): A failed cell is a cell in which the terminal device detects an RLF, or a target cell in which an HOF occurs.

(2) Connection failure type: An RLF or an HOF.

(3) Previous cell (which is also referred to as a source cell) information (previousPCellId): A source cell is a cell in which the terminal device last receives a handover command.

(4) Reestablishment cell information: Information about a cell in which the terminal device initiates reestablishment after the connection failure occurs.

(5) Cell radio network temporary identifier (C-RNTI): When a type of the connection failure is an RLF, the C-RNTI is an identifier of the terminal device in a cell (namely, a failed cell) in which the RLF occurs. Alternatively, when a type of the connection failure is an HOF, the C-RNTI is an identifier of the terminal device in a source cell.

The RLF report may further include quality information of each cell, for example, include a measurement result of each cell.

In embodiments of this application, the cell information includes a PLMN identifier of the cell and cell identifier information. The cell identifier information is used to identify the cell. For example, the cell may be identified by a cell identifier. Alternatively, the cell may be identified by a PCI and a frequency. Alternatively, the cell may be identified by a cell identifier, a PCI, and a frequency. Optionally, the cell identifier information may further include at least one of a tracking area code (TAC) and a radio access network area code (RANAC).

It may be understood that, in an HOF scenario, the terminal device may not know a CGI of the target cell. In this case, cell information of the target cell (namely, the foregoing failed cell information) may include a PCI and a frequency of the target cell.

2. Premature Handover, Wrong Handover, and Delayed Handover:

The premature handover, the wrong handover, and the delayed handover may include an intra-system scenario, or may include an inter-system scenario. For a specific definition, refer to descriptions in 3GPP TS36.300, TS38.300, or another protocol. It may be understood that the intra-system scenario may further include an intra-system intra-RAT scenario and/or an inter-system inter-RAT scenario. In embodiments of this application, only an example is provided for description.

Premature handover: The terminal device successfully accesses a target cell from a source cell, but an RLF occurs soon after the terminal device successfully accesses the target cell, or an HOF occurs in a handover process between the terminal device and the target cell. Then, the terminal device attempts to perform reestablishment or reconnection in the source cell. Alternatively, the terminal device attempts to access a cell in a system or a standard corresponding to the source cell.

Wrong handover: The terminal device successfully accesses a target cell from a source cell, but an RLF occurs soon after the terminal device successfully accesses the target cell, or an HOF occurs in a handover process between the terminal device and the target cell. Then, the terminal device attempts to perform reestablishment in a cell different from both the source cell and the target cell.

Delayed handover: An RLF occurs after the terminal device stays in a serving cell for long time, and then the terminal device attempts to perform reestablishment in another cell, or the terminal device attempts to access another cell in a system and/or a standard different from that corresponding to the serving cell.

3. Transmission of an RLF Report:

It may be understood that an access network device to which the terminal device reports the RLF report or an access network device that receives the RLF report from the terminal device may be a source access network device (for example, an access network device to which a cell in which the terminal device last receives a handover command belongs), a failed access network device (for example, an access network device to which a cell in which an RLF occurs belongs, or an access network device to which a handover target cell belongs in a premature handover scenario or a wrong handover scenario), or another access network device (for example, an access network device to which a reestablishment cell belongs). The source access network device may be an access network device to which a source cell belongs, and the failed access network device may be an access network device to which a failed cell belongs. In the premature handover scenario or the wrong handover scenario, the failed access network device may also be referred to as a target access network device, and is an access network device to which a target cell belongs. It may be understood that the source cell and the target cell may belong to a same access network device, in other words, the source access network device and the target access network device may be the same.

For example, the access network device that receives the RLF report from the terminal device is the another access network device. In a possible implementation, for example, when the type of the connection failure is an RLF, after receiving the RLF report, the access network device may send, based on cell information included in the RLF report or cell information that is not included in the RLF report (where in a scenario of an inter-RAT and/or inter-system RLF report, for a detailed description, refer to transmission of a cross radio access technology RLF report that is described in the fourth point below), the RLF report to the access network device to which the failed cell belongs. For example, in the delayed handover scenario, the access network device may send the RLF report to an access network device to which a cell in which an RLF is detected belongs (namely, the access network device to which the failed cell belongs in the RLF report). In the premature handover scenario or the wrong handover scenario, the access network device may send the RLF report to the target access network device (the access network device to which the failed cell belongs in the RLF report).

Further, the RLF report may be sent to the source access network device. For example, when the type of the connection failure is an RLF in the premature handover scenario or the wrong handover scenario, as described above, after the another access network device receives the RLF report from the terminal device, the RLF report is first sent to the target access network device. The target access network device may perform problem analysis based on the RLF report, for example, identify that the connection failure is caused by a premature handover or a wrong handover. Then, the target access network device may forward the RLF report to the source access network device. Optionally, the target access network device may further send a C-RNTI of the terminal device in the source cell and/or another mobility-related parameter to the source access network device.

For example, the access network device that receives the RLF report from the terminal device is the another access network device. In another possible implementation, for example, when the type of the connection failure is an HOF, after receiving the RLF report, the access network device may send, based on cell information included in the RLF report, the RLF report to the source access network device (the access network device to which the source cell belongs in the RLF report).

It may be understood that communication between the access network devices may be performed based on an interface between the access network devices, or may be performed based on an interface between the access network device and a core network device. Information sent by an access network device serving as a transmitting end may be transmitted to an access network device serving as a receiving end without being forwarded by another access network device, or may be transmitted to the access network device serving as the receiving end through forwarding by another access network device.

An example in which a terminal device reports an RLF report to another access network device in an intra-system intra-RAT scenario, and different access network devices perform communication based on an interface between the access network devices is used.

FIG. 1a is a schematic diagram of transmission of an RLF report when an RLF occurs in a premature handover scenario. First, a handover message is exchanged and transmitted between a source access network device and a target access network device. Then, the source access network device sends a handover command to a terminal device. After receiving the handover command, the terminal device successfully accesses the target access network device, and an RLF (which is represented by using a cross sign X in FIG. 1a) occurs in the target access network device. After the RLF occurs, the terminal device performs reestablishment in a source cell and records an RLF report. Subsequently, after accessing another access network device, the terminal device sends the RLF report to the another access network device, and the another access network device sends a failure indication message to the target access network device. The failure indication message may include the RLF report. Finally, the target access network device may send the RLF report to the source access network device, for example, send the RLF report to the source access network device by using a handover report message or another message. It may be understood that an execution sequence of the step of recording the RLF report by the terminal device in FIG. 1a is merely an example, and the terminal device may alternatively perform this step when the RLF occurs.

Figure 1B:
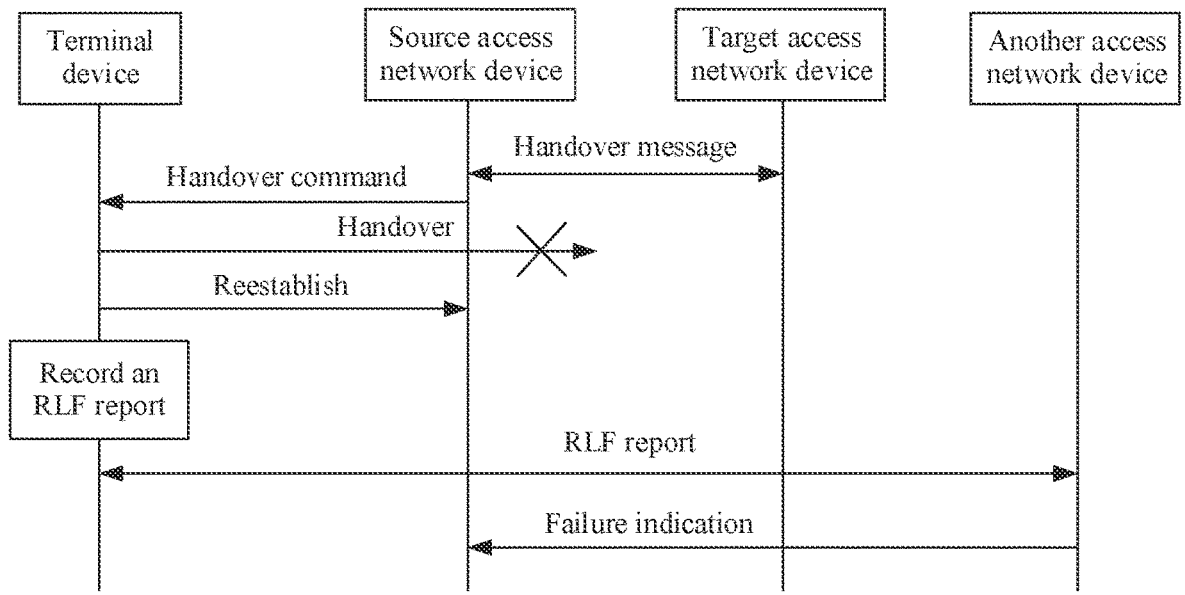
FIG. 1b is a schematic diagram 2 of existing transmission of an RLF report.

FIG. 1b is a schematic diagram of transmission of an RLF report when an HOF occurs in a premature handover scenario. An HOF (which is represented by using a cross sign X in FIG. 1b) occurs in a process in which a terminal device receives a handover command and then is handed over from a source access network device to a target access network device. Then, the terminal device performs reestablishment in a source cell and records an RLF report. Subsequently, after accessing another access network device, the terminal device sends the RLF report to the another access network device, and the another access network device sends a failure indication message to the source access network device. The failure indication message may include the RLF report. It may be understood that an execution sequence of the step of recording the RLF report by the terminal device in FIG. 1b is merely an example, and the terminal device may alternatively perform this step when the HOF occurs.

Figure 1C:
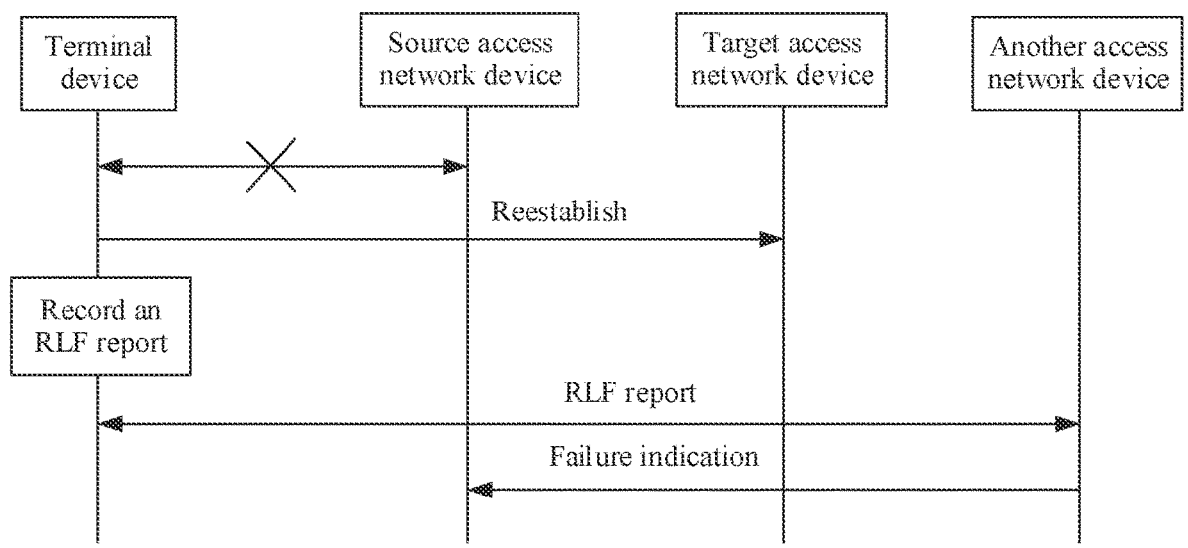
FIG. 1c is a schematic diagram 3 of existing transmission of an RLF report.

FIG. 1c is a schematic diagram of transmission of an RLF report in a delayed handover scenario. An RLF (which is represented by using a cross sign X in FIG. 1c) occurs when a terminal device is in a source cell, and then the terminal device performs reestablishment in a target cell and records an RLF report. After accessing another access network device, the terminal device sends the RLF report to the another access network device, and the another access network device sends a failure indication to a source access network device. The failure indication may include the RLF report. It may be understood that an execution sequence of the step of recording the RLF report by the terminal device in FIG. 1c is merely an example, and the terminal device may alternatively perform this step when the RLF occurs.

4. Transmission of a Cross Radio Access Technology RLF Report (Cross RAT RLF Report):

The RAT is a radio access technology, and may also be referred to as a standard. Reporting of the cross RAT RLF report is transmission of an inter-system or inter-RAT RLF report. To be specific, a terminal device reports an RLF report of another system/standard in a system/standard.

There are an LTE RLF report and an NR RLF report in a current communication system, and a future communication system may further include an RLF report of another type, for example, an eLTE RLF report. eLTE refers to an LTE access network device or an LTE cell connected to an NR core network device. The LTE RLF report may be understood as follows: Content of the RLF report includes at least LTE-related information (cell information, a measurement result, and the like), or the RLF report is encoded in an LTE RRC format. Another RLF report is similar, and details are not described herein again. Optionally, the eLTE RLF report may be considered as a special case of the LTE RLF report or the NR RLF report. For example, the eLTE RLF report is a special case of the LTE RLF report. The eLTE RLF report may be understood as follows: Content of the RLF report includes at least eLTE-related information (cell information, a measurement result, and the like), or the RLF report is encoded in an LTE RRC format.

For example, a communication system includes an LTE RLF report and an NR RLF report, and a terminal device may report the LTE RLF report in an NR network. The LTE RLF report is encoded in the LTE RRC format, an access network device in the NR network may not be capable of identifying the encoding format. Therefore, when reporting the LTE RLF report in the NR network, the terminal device further carries information about a target LTE cell that needs to be forwarded. The information is used by the NR access network device to forward the LTE RLF report to an LTE access network device to which the target LTE cell belongs. For example, if a type of a connection failure is an RLF, the information about the target LTE cell may be cell information of an LTE cell in which the RLF occurs. If the type of the connection failure is an HOF, the information about the target LTE cell may be cell information of an LTE cell in which the terminal device is located when the terminal device last receives a handover command before the connection failure.

For a manner in which the terminal device reports the NR RLF report in an LTE network, refer to the foregoing manner in which the terminal device reports the LTE RLF report in the NR network. Details are not described herein again.

5. Access Network Device:

The access network device in embodiments of this application is a device that enables a terminal device to access a wireless network, and may be an evolved NodeB (eNB or eNodeB) in LTE, a base station in a 5th generation (5G) network or a future evolved public land mobile network (PLMN), a broadband network gateway (BNG), an aggregation switch, a non-3rd generation partnership project (3GPP) access device, or the like. This is not specifically limited in embodiments of this application. Optionally, the base station in embodiments of this application may include base stations of various forms, for example, a macro base station, a micro base station (which is also referred to as a small cell), a relay station, an access point, a next-generation NodeB (gNodeB, gNB), a home base station (for example, a home evolved NodeB or a home NodeB, HNB), a baseband unit (BBU), a transmission reception point (TRP), a transmitting point (TP), and a mobile switching center. This is not specifically limited in embodiments of this application.

Optionally, the access network device in embodiments of this application may be deployed on a high-altitude platform or a satellite. Optionally, when deployed on the high-altitude platform or the satellite, the access network device may be used as a layer 1 (L1) relay, may be used as a base station, may be used as a distributed unit (DU), or may be used as an integrated access and backhaul (TAB) node.

In a possible implementation, the access network device in embodiments of this application may alternatively be a central unit (CU) or a distributed unit (DU), or the access network device may include a CU and a DU. A plurality of DUs may share one CU. One DU may alternatively be connected to a plurality of CUs. It may be understood that the base station is divided into the CU and the DU from the perspective of a logical function. The CU and the DU may be physically separated, or may be deployed together. This is not specifically limited in embodiments of this application. The CU and the DU may be connected through an interface, for example, an F1 interface. The CU and the DU may be obtained through division based on protocol layers of a wireless network. For example, functions of an RRC protocol layer, a service data adaptation protocol (SDAP) protocol layer, and a packet data convergence protocol (PDCP) protocol layer are set in the CU, and functions of a radio link control (RLC) protocol layer, a media access control (MAC) protocol layer, a physical (PHY) protocol layer, and the like are set in the DU.

It may be understood that processing function division of the CU and the DU based on the protocol layers is merely an example, and there may be other division.

For example, the CU or the DU may have functions of more protocol layers through division. For example, the CU or the DU may alternatively have some processing functions of the protocol layers through division. In a design, some functions of the RLC layer and functions of a protocol layer above the RLC layer are set on the CU, and remaining functions of the RLC layer and functions of a protocol layer below the RLC layer are set on the DU. In another design, functions of the CU or the DU may alternatively be obtained through division based on a service type or another system requirement. For example, division is performed based on a latency, a function whose processing time needs to satisfy a latency requirement is disposed on the DU, and a function whose processing time does not need to satisfy the latency requirement is disposed on the CU. In another design, the CU may alternatively have one or more functions of the core network. One or more CUs may be disposed in a centralized manner or a separated manner. For example, the CUs may be disposed on a network side for ease of centralized management. The DU may have a plurality of radio frequency functions, or the radio frequency functions may be disposed remotely.

Optionally, the CU may include a CU control plane (CU-CP) and a CU user plane (CU-UP). It may be understood that the CU is divided into the CU-CP and the CU-UP by logical functions. The CU-CP and the CU-UP may be divided based on a protocol layer of a wireless network. For example, a function of the RRC protocol layer and a function that is of the PDCP protocol layer and that corresponds to a signal radio bearer (SRB) are set in the CU-CP, and a function that is of the PDCP protocol layer and that corresponds to a data radio bearer (DRB) is set in the CU-UP. In addition, the function of the SDAP protocol layer may also be set in the CU-UP.

Figure 2A:
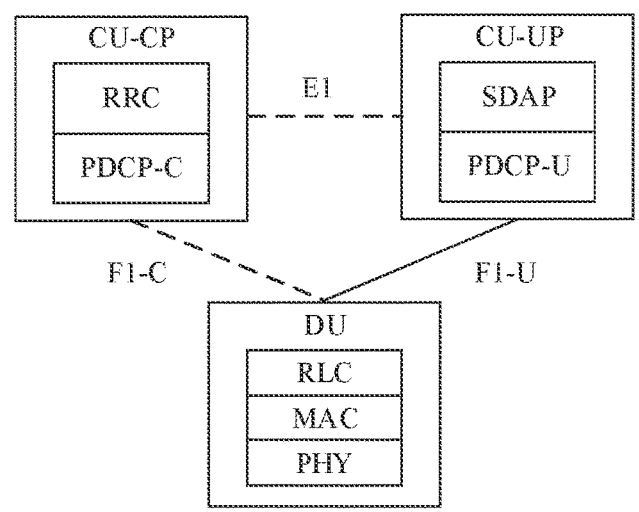
FIG. 2a is a schematic diagram 1 of a structure of an access network device according to an embodiment of this application.
Figure 2B:
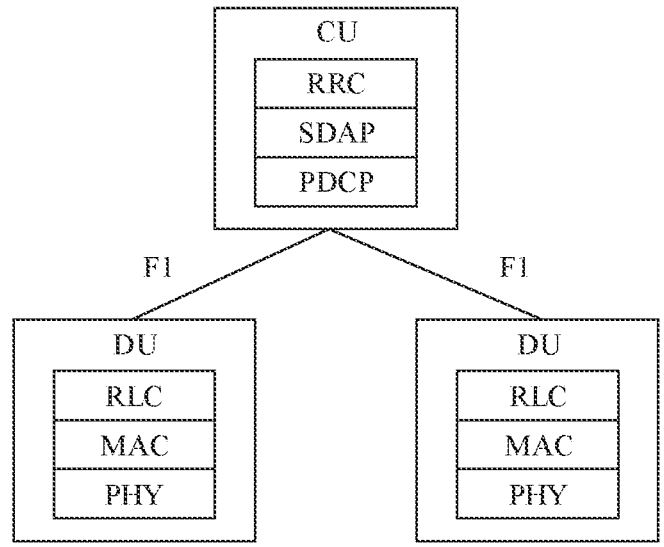
FIG. 2b is a schematic diagram 2 of a structure of an access network device according to an embodiment of this application.

For example, the access network device includes a CU and a DU, and the CU includes a CU-CP and a CU-UP. FIG. 2a is a schematic diagram of a structure of an access network device according to an embodiment of this application. PDCP-C is a PDCP control plane, and PDCP-U is a PDCP user plane. F1-C is an F1 control plane interface, and F1-U is an F1 user plane interface. For example, the access network device includes a CU and two DUs. FIG. 2b is a schematic diagram of a structure of another access network device according to an embodiment of this application.

6. Ran Sharing:

RAN sharing means that one physical cell may be shared with a plurality of networks. Usually, one physical cell is shared with a plurality of logical cells, and different logical cells may belong to different PLMNs and/or different non-public networks. The physical cell shared with the plurality of logical cells may also be referred to as a shared cell, and the plurality of logical cells may be referred to as a plurality of logical cells of the shared cell.

It may be understood that the plurality of logical cells sharing the same physical cell have same physical resources, and a difference lies in different logical configurations of the cells.

In a scenario in which a shared cell is shared with a plurality of logical cells, different logical cells may belong to a same access network device or different access network devices, that is, the different logical cells may be managed by a same access network device or different access network devices.

When the different logical cells belong to a same access network device, generally, a base station to which the shared cell belongs may be shared with a plurality of networks: or a DU to which the shared cell belongs and a CU connected to the DU are simultaneously shared with a plurality of networks. When the different logical cells belong to different access network devices, a DU to which the shared cell belongs may be shared with a plurality of networks, but a CU connected to the DU is not shared.

Figure 2C:
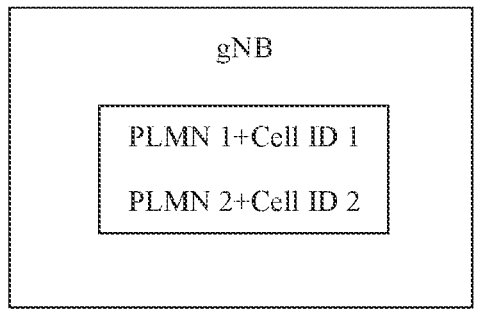
FIG. 2c is a schematic diagram 1 of RAN sharing according to an embodiment of this application.
Figure 2D:
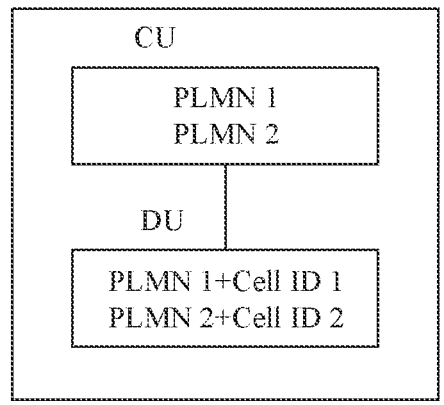
FIG. 2d is a schematic diagram 2 of RAN sharing according to an embodiment of this application.
Figure 2E:
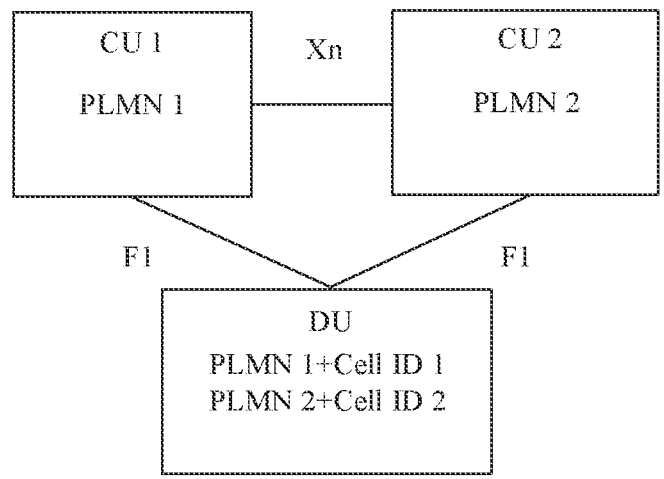
FIG. 2e is a schematic diagram 3 of RAN sharing according to an embodiment of this application.

For example, a shared cell is shared with a PLMN 1 and a PLMN 2, a logical cell in the PLMN 1 is a logical cell 1 (which is identified by a cell ID 1), and a logical cell in the PLMN 2 is a logical cell 2 (which is identified by a cell ID 2). FIG. 2c is a schematic diagram of sharing a base station with a plurality of networks. To be specific, the base station manages the logical cell 1 and the logical cell 2. FIG. 2d is a schematic diagram of simultaneously sharing a CU and a DU with a plurality of networks. FIG. 2e is a schematic diagram in which a DU is shared with a plurality of networks but a CU 1 and a CU 2 connected to the DU are not shared. The CU 1 is a CU to which the logical cell 1 belongs, and the CU 2 is a CU to which the logical cell 2 belongs.

In a RAN sharing scenario, a cell information list is broadcast in the shared cell, where the cell information list includes a plurality of pieces of logical cell information (for example, CGIs and TACs of the logical cells). A logical cell identified by $1^{st}$ logical cell information in the cell information list may be used as the $1^{st}$ logical cell of the shared cell based on a sequence of the logical cell information in the cell information list.

In a communication process, a terminal device camps on or accesses a shared cell by using one of a plurality of networks that share the cell, that is, the terminal device camps on or accesses a logical cell in the network. The logical cell on which the terminal device camps or that the terminal device accesses may be referred to as a logical cell selected by the terminal device. The selected logical cell may also be referred to as a registered logical cell.

It may be understood that the $1^{st}$ logical cell of the shared cell may also be understood as the $1^{st}$ logical cell that shares a same physical cell with the logical cell selected by the terminal device. In the shared cell scenario, the logical cell selected by the terminal device may be the same as or different from the $1^{st}$ logical cell.

It may be understood that, for any terminal device that camps on or accesses the shared cell by using any one of the plurality of networks sharing the cell, a logical cell identified by the $1^{st}$ logical cell information in the cell information list may be referred to as the $1^{st}$ logical cell.

For example, in FIG. 2c to FIG. 2e, the logical cell 1 in the PLMN 1 is the $1^{st}$ logical cell. When a terminal device 1 camps on or accesses the shared cell by using the PLMN 1, the logical cell 1 in the PLMN 1 is a logical cell selected by the terminal device 1. When a terminal device 2 camps on or accesses the shared cell by using the PLMN 2, the logical cell 2 in the PLMN 2 is a logical cell selected by the terminal device 2. For the terminal device 1 and the terminal device 2, the logical cell 1 in the PLMN 1 may be referred to as the $1^{st}$ logical cell.

For example, in the scenario shown in FIG. 2e, different CUs manage different logical cells. When a terminal device selects to access the logical cell 2, and a connection failure occurs in the logical cell 2, if an RLF report includes information about the logical cell 1, the RLF report is sent to the CU 1. However, because the terminal device does not access the logical cell 1, in other words, the terminal device is not a terminal device managed by the CU 1, the CU 1 cannot optimize a configuration of a mobility-related parameter of the terminal device based on the RLF report. Therefore, information about which logical cells should be included in the RLF report needs to be considered, so that the RLF report can be transmitted to the CU 2. In other words, how to record the RLF report needs to be considered, so that the RLF report can be used to optimize a mobility-related parameter.

The following describes the technical solutions in embodiments of this application with reference to the accompanying drawings in embodiments of this application. In the descriptions of this application, unless otherwise specified. "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to various communication systems, for example, orthogonal frequency division multiple access (OFDMA), single carrier frequency division multiple access (single carrier FDMA, SC-FDMA), a non-terrestrial network (NTN), and another system. Terms "system" and "network" may be interchanged with each other. The OFDMA system may implement wireless technologies such as evolved universal terrestrial radio access (E-UTRA) and ultra mobile broadband (UMB). The E-UTRA is an evolved release of a universal mobile telecommunications system (UMTS). The 3rd generation partnership project (3GPP) uses a new release of the E-UTRA in long term evolution (LTE) and various releases evolved based on the LTE. A 5th generation (5G) communication system is a next-generation communication system under study. The 5G communication system includes a 5G non-standalone (NSA) mobile communication system, a 5G standalone (SA) mobile communication system, or both a 5G NSA mobile communication system and a 5G SA mobile communication system. In addition, the communication system may be further applied to a future-oriented communication technology, and are all applicable to the technical solutions provided in embodiments of this application. The foregoing communication systems used in this application are merely examples for description, and communication systems used in this application are not limited thereto. A general description is provided herein. Details are not described below again.

Figure 3:
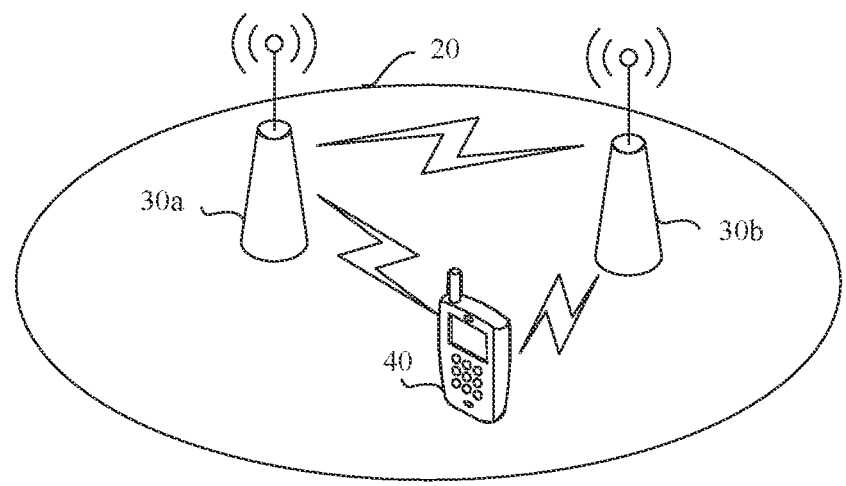
FIG. 3 is a schematic diagram of a structure of a communication system according to an embodiment of this application.

FIG. 3 shows a communication system 20 according to an embodiment of this application. The communication system 20 includes a terminal device 40, a first access network device 30a, and/or a second access network device 30b. Optionally, the communication system 20 may further include a third access network device 30c (which is not shown in FIG. 3). The third access network device 30c is different from the first access network device 30*a* and the second access network device 30*b*.

The first access network device 30*a* may be understood as an access network device to which a source logical cell belongs, and the second access network device 30*b* may be understood as an access network device to which a failed logical cell in which a connection failure occurs belongs.

In this embodiment of this application, a connection failure occurs in the terminal device 40. The terminal device 40 records and sends a first report. The first report includes cell information of a first logical cell, or the first report includes a PLMN identifier of a first logical cell and cell information of a second logical cell. The first logical cell includes a source logical cell and/or a failed logical cell in which the connection failure occurs. The first logical cell and the second logical cell share a physical cell, and the second logical cell is a $1^{st}$ logical cell that shares the physical cell.

Based on this solution, a connection failure rate of the terminal device in a RAN sharing scenario can be reduced, and a handover success rate can be improved. For example, because the first report includes cell information of the source logical cell and/or cell information of the failed logical cell, when an access network device that receives the first report from the terminal device is a third access network device, the third access network device may send, based on the cell information of the source logical cell and/or the cell information of the failed logical cell, the first report to an access network device to which the source logical cell belongs and/or an access network device to which the failed logical cell belongs, so that the access network devices optimize a mobility-related parameter, to reduce the connection failure rate of the terminal device, and improve the handover success rate.

Alternatively, because the first report includes a PLMN identifier of the source logical cell and/or a PLMN identifier of the failed logical cell, and the cell information of the second logical cell, when an access network device that receives the first report from the terminal device is a third access network device, the third access network device may first send, based on the cell information of the second logical cell, the first report to an access network device to which the second logical cell belongs, so that the access network device to which the second logical cell belongs determines, based on the PLMN identifier of the first logical cell, an access network device to which the first logical cell belongs. For example, the access network device to which the second logical cell belongs determines, based on whether the PLMN identifier of the first logical cell is the same as a PLMN identifier of the second logical cell, the access network device to which the first logical cell belongs. Alternatively, the access network device to which the second logical cell belongs determines the corresponding cell information of the first logical cell based on the PLMN identifier of the first logical cell and a stored cell information list, and determines, based on the cell information of the first logical cell, an access network device to which the first logical cell belongs. Alternatively, when the first report includes the cell information of the second logical cell and the cell information of the first logical cell, an access network device to which the second logical cell belongs may determine, based on the cell information that is included in the first report and that is of the first logical cell, an access network device to which the first logical cell belongs. If the access network device to which the first logical cell belongs is the same as the access network device to which the second logical cell belongs, the access network device to which the second logical cell belongs may optimize a mobility-related parameter of the second logical cell, to reduce the connection failure rate of the terminal device, and improve the handover success rate. If the access network device to which the first logical cell belongs is different from the access network device to which the second logical cell belongs, the access network device to which the second logical cell belongs sends the first report to the access network device to which the first logical cell belongs, so that the access network device to which the first logical cell belongs optimizes a mobility-related parameter, to reduce the connection failure rate of the terminal device, and improve the handover success rate.

Optionally, the terminal device 40 in this embodiment of this application may be a device such as a terminal or a chip that may be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

Figure 4:
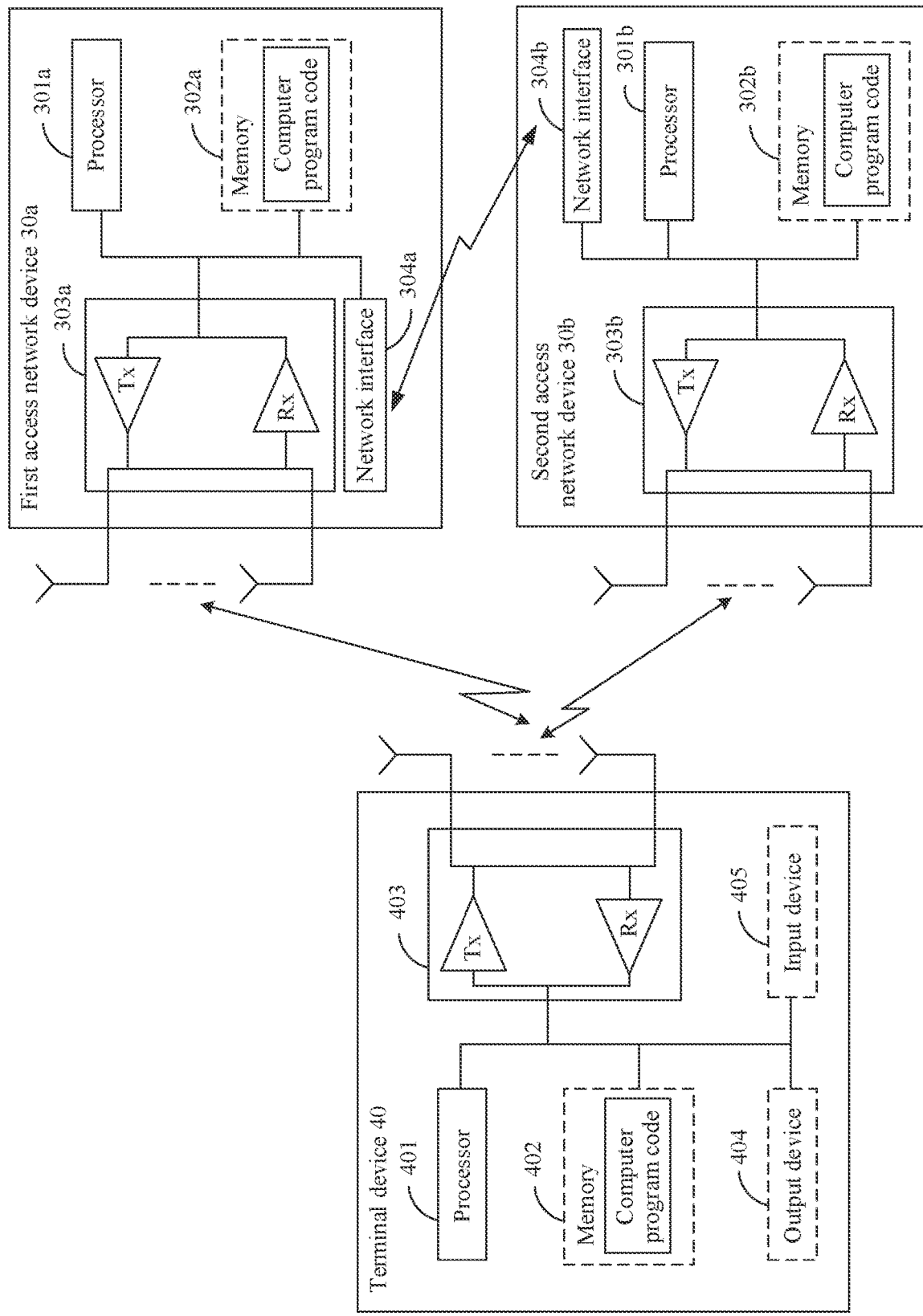
FIG. 4 is a schematic diagram of structures of a terminal device, a first access network device, and a second access network device according to an embodiment of this application.

Optionally, FIG. 4 is a schematic diagram of structures of a first access network device 30*a*, a second access network device 30*b*, and a terminal device according to an embodiment of this application.

The terminal device includes at least one processor (an example in which one processor 401 is included is used for description in FIG. 4) and at least one transceiver (an example in which one transceiver 403 is included is used for description in FIG. 4). Optionally, the terminal device may further include at least one memory (an example in which one memory 402 is included is used for description in FIG. 4), at least one output device (an example in which one output device 404 is included is used for description in FIG. 4), and at least one input device (an example in which one input device 405 is included is used for description in FIG. 4).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. In specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, or processing cores configured to process data (for example, computer program instructions).

The memory 402 may be an apparatus having a storage function. For example, the memory 402 may be a read-only memory (ROM) or another type of static storage device that can store static information and instructions, or a random access memory (RAM) or another type of dynamic storage device that can store information and instructions. The memory may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible by a computer, but is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the communication method in embodiments of this application. Optionally, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network such as the Ethernet, a radio access network (RAN), or a wireless local area network (WLAN). The transceiver 403 includes a transmitter (Tx) and a receiver (receiver, Rx). The transceiver may also be an input/output interface.

The output device 404 communicates with the processor 401, and may display information in a plurality of manners. For example, the output device 404 may be a liquid crystal display (LCD), a light emitting diode (LED) display device, a cathode ray tube (CRT) display device, a projector (projector), or the like.

The input device 405 communicates with the processor 401, and may receive an input of a user in a plurality of manners. For example, the input device 405 may be a mouse, a keyboard, a touchscreen device, or a sensor device.

The first access network device 30a includes one or more processors (an example in which one processor 301a is included is used for description in FIG. 4), at least one transceiver (an example in which one transceiver 303a is included is used for description in FIG. 4), and at least one network interface (an example in which one network interface 304a is included is used for description in FIG. 4).

Optionally, the first access network device 30a may further include at least one memory (an example in which one memory 302a is included is used for description in FIG. 4). The processor 301a, the memory 302a, the transceiver 303a, and the network interface 304a are connected through a communications line. The network interface 304a is configured to connect to a core network device through a link (such as an SI interface)(where the connection is not shown in FIG. 4), or connect to a network interface of another network device through a wired or wireless link (such as an X2 interface). This is not specifically limited in this embodiment of this application. In addition, for the related description of the processor 301a, the memory 302a, and the transceiver 303a, refer to the description of the processor 401, the memory 402, and the transceiver 403 in the terminal device, and details are not repeated herein.

The second access network device 30b includes one or more processors (an example in which one processor 301b is included is used for description in FIG. 4), at least one transceiver (an example in which one transceiver 303b is included is used for description in FIG. 4), and at least one network interface (an example in which one network interface 304b is included is used for description in FIG. 4). Optionally, the second access network device 30b may further include at least one memory (an example in which one memory 302b is included is used for description in FIG. 4). The processor 301b, the memory 302b, the transceiver 303b, and the network interface 304b are connected through a communications line. The network interface 304b is configured to connect to a core network device through a link (such as an S1 interface) (where the connection is not shown in FIG. 4), or connect to a network interface of another network device through a wired or wireless link (such as an X2 interface). This is not specifically limited in this embodiment of this application. In addition, for the related description of the processor 301b, the memory 302b, and the transceiver 303b, refer to the description of the processor 401, the memory 402, and the transceiver 403 in the terminal device, and details are not repeated herein.

Figure 5:
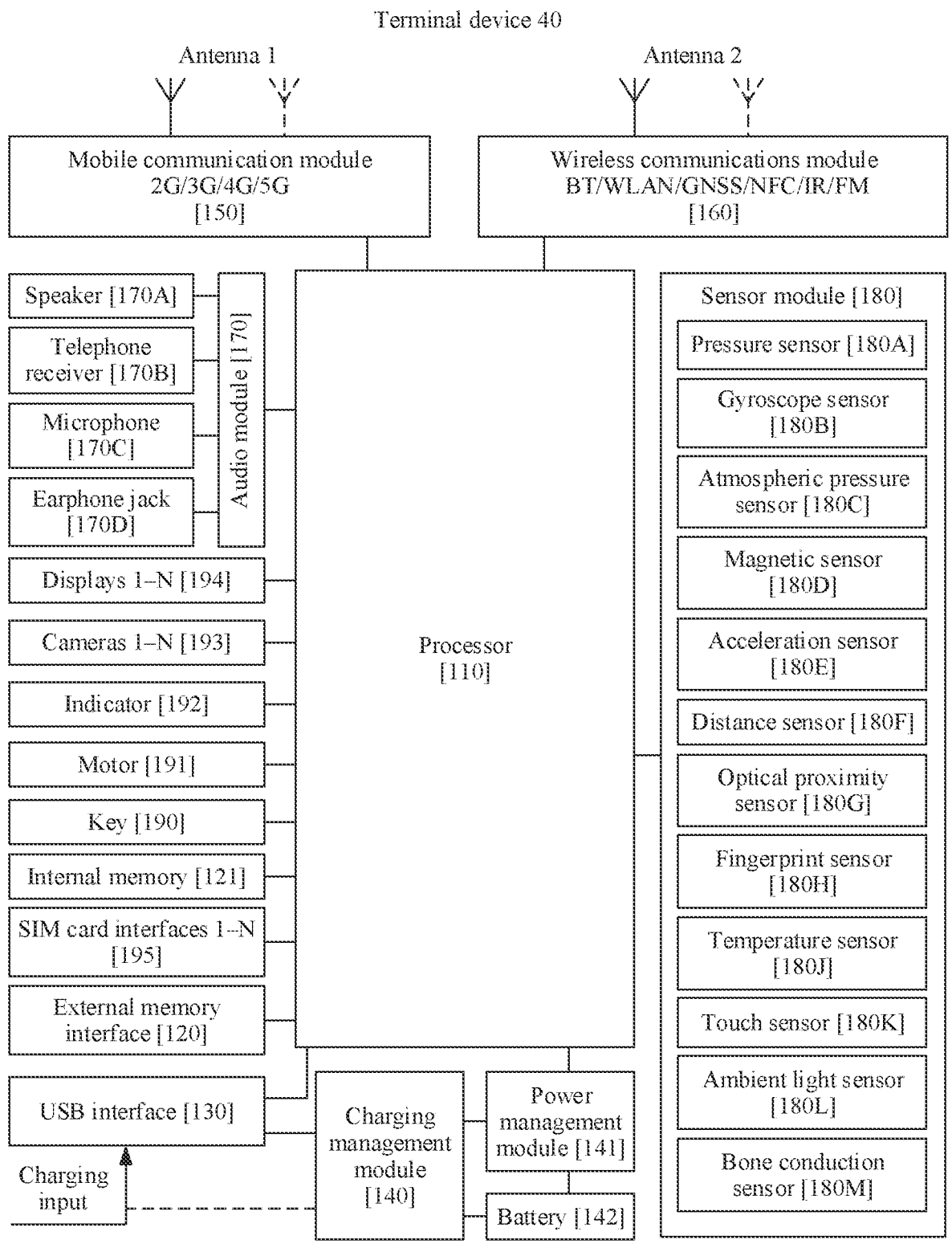
FIG. 5 is a schematic diagram of a structure of another terminal device according to an embodiment of this application.

With reference to the schematic diagram of the structure of the terminal device 40 shown in FIG. 4, for example, FIG. 5 is a specific structural form of the terminal device 40 according to an embodiment of this application.

In some embodiments, a function of the processor 401 in FIG. 4 may be implemented by a processor 110 in FIG. 5.

In some embodiments, a function of the transceiver 403 in FIG. 4 may be implemented by using an antenna 1, an antenna 2, a mobile communication module 150, a wireless communications module 160, or the like in FIG. 5.

The antenna 1 and the antenna 2 are configured to transmit and receive electromagnetic wave signals. Each antenna in the terminal device 40 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution used for wireless communication including 2G, 3G, 4G, 5G, and the like on the terminal device 40. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The wireless communications module 160 may provide a solution used for wireless communication including a wireless local area network (WLAN) (for example, a Wi-Fi network), Bluetooth (BT), a global navigational satellite system (GNSS), frequency modulation (FM), near field communications (NFC), an infrared (IR) technology, and the like on the terminal device 40. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. When the terminal device 40 is a first device, that the wireless communications module 160 may provide a solution used for NFC wireless communication on the terminal device 40 means that the first device includes an NFC chip. The NFC chip may improve an NFC wireless communication function. When the terminal device 40 is a second device, that the wireless communications module 160 may provide a solution used for NFC wireless communication on the terminal device 40 means that the first device includes an electronic label (for example, a radio frequency identification (radio frequency identification, RFID) label). When approaching the electronic tag, an NFC chip of another device may perform NFC wireless communication with the second device.

In some embodiments, the antenna 1 of the terminal device 40 is coupled to the mobile communication module 150, and the antenna 2 is coupled to the wireless communications module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), LTE, BT, a GNSS, a WLAN, NFC, FM, an IR technology, and/or the like. The GNSS may include one or more of a global positioning system (global positioning system, GPS), a global navigation satellite system (GLONASS), a Beidou satellite navigation system (BDS), a quasi-zenith satellite system (QZSS), a satellite based augmentation system (SBAS), or another positioning system.

In some embodiments, a function of the memory 402 in FIG. 4 may be implemented by an internal memory 121 in FIG. 5, an external memory (for example, a Micro SD card) connected to an external memory interface 120, or the like.

In some embodiments, a function of the output device 404 in FIG. 4 may be implemented by using a display 194 in FIG. 5. The display 194 is configured to display an image, a video, and the like. The display 194 includes a display panel.

In some embodiments, a function of the input device 405 in FIG. 4 may be implemented by using a mouse, a keyboard, a touchscreen device, or a sensor module 180 in FIG. 5. For example, as shown in FIG. 5, the sensor module 180 may include one or more of a pressure sensor 180A, a gyroscope sensor 180B, an atmospheric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, or a bone conduction sensor 180M. This is not specifically limited in this embodiment of this application.

In some embodiments, as shown in FIG. 5, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (also referred to as a "loudspeaker"), a telephone receiver 170B (also referred to as a "handset"), a microphone 170C (also referred to as a "mic" or "mike"), an earphone jack 170D, or the like. This is not specifically limited in this embodiment of this application.

It may be understood that the structure shown in FIG. 5 constitute no specific limitation on the terminal device 40. For example, in some other embodiments of this application, the terminal device 40 may include more or fewer components than those shown in the figure, or some components may be combined, some components may be split, or the components may be differently arranged. The components shown in the figure may be implemented by hardware, software, or a combination of software and hardware.

With reference to the accompanying drawings, the following describes in detail the communication method provided in embodiments of this application by using an example in which the access network device 30 shown in FIG. 3 interacts with the terminal device 40.

It may be understood that in embodiments of this application, the terminal device and/or the access network device may perform some or all steps in embodiments of this application. These steps or the operations are merely examples. In embodiments of this application, other operations or variations of various operations may be further performed. In addition, the steps may be performed in a sequence different from a sequence presented in embodiments of this application, and not all operations in embodiments of this application may be performed.

It may be understood that, in embodiments of this application, interaction between the access network device and the terminal device is also applicable to interaction between the CU and the terminal device or interaction between the DU and the terminal device. It may be understood that, in embodiments of this application, a mechanism of interaction between the access network device and the terminal device may be appropriately transformed, to be applicable to interaction between the CU or the DU and the terminal device.

It should be noted that names of messages between network elements, names of parameters in the messages, or the like in the following embodiments of this application are merely examples, and there may be other names in a specific implementation. This is not specifically limited in embodiments of this application.

Figure 6:
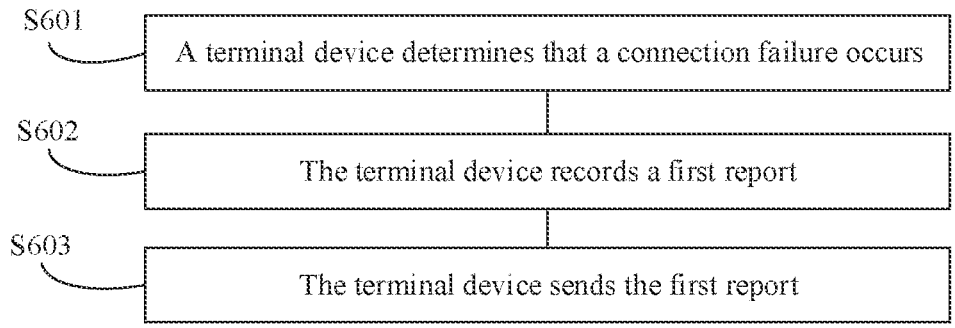
FIG. 6 is a schematic flowchart 1 of a communication method according to an embodiment of this application.

FIG. 6 shows a communication method according to an embodiment of this application. The communication method includes the following steps.

S601: A terminal device determines that a connection failure occurs.

The connection failure may be an RLF or an HOF.

To describe the communication method provided in this application more clearly, in the following embodiments, an example in which a cell in embodiments of this application includes a cell A, a cell B, and a cell C is used for description.

In a possible implementation, when the connection failure is an RLF, there are the following two scenarios. One scenario is that after the terminal device is handed over from the cell A to the cell B, the RLF occurs in the cell B soon, that is, a premature handover or a wrong handover scenario. Another scenario is that the RLF occurs on the terminal device in the cell A, that is, a delayed handover scenario.

Optionally, in the delayed handover scenario, the terminal device may be handed over from the cell C to the cell A, and maintains a connection to the cell A for a period of time (which is different from the premature handover). Alternatively, the terminal device may be connected to the cell A when performing initial connection. This is not specifically limited in this embodiment of this application. Optionally, after the RLF occurs in the cell A, the terminal device may attempt to perform reestablishment in the cell B or access the cell B.

In another possible implementation, when the connection failure is an HOF, the following scenario exists: The HOF occurs in a process in which the terminal device is handed over from the cell A to the cell B. In other words, the terminal device fails to access the cell B.

It may be understood that, in this embodiment of this application, the cell A may be a shared cell or a non-shared cell. The cell B may be a shared cell or a non-shared cell. The cell C may be a shared cell or a non-shared cell. However, it should be noted that, when the cell A and the cell B coexist, at least one of the cell A and the cell B is a shared cell. Alternatively, when the cell A and the cell C coexist, at least one of the cell A and the cell C is a shared cell.

In this embodiment of this application, when the cell A, the cell B, or the cell C is a non-shared cell, the non-shared physical cell has a unique logical cell. The unique logical cell may be referred to as a $1^{st}$ logical cell, and may be specifically marked as the cell A, the cell B, or the cell C. To be specific, when a physical cell is a shared cell, the physical cell may have a plurality of (at least two) logical cells. When a physical cell is a non-shared cell, the physical cell has only one logical cell. Optionally, in this embodiment of this application, the logical cell of the non-shared cell may be referred to as a $1^{st}$ logical cell of the physical cell.

In this embodiment of this application, when the cell A is a shared cell, an example in which the cell A includes a logical cell A1 and a logical cell A2 is used. It is assumed that the logical cell A1 is a $1^{st}$ logical cell of the cell A, the logical cell A2 is a logical cell selected by the terminal device in the cell A, and the logical cell A1 and the logical cell A2 belong to different access network devices. In this case, after the terminal device is handed over from the cell A to the cell B, in a scenario in which an RLF occurs in the cell B soon, the cell A may be referred to as a source cell, and the logical cell A2 may be referred to as a source logical cell. In a scenario in which an RLF occurs on the terminal device in the cell A, it may be understood that the RLF occurs on the terminal device in the logical cell A2 of the cell A. The cell A may be referred to as a failed cell, and the logical cell A2 may be referred to as a failed logical cell. In a scenario in which an HOF occurs in a process in which the terminal device is handed over from the cell A to the cell B, the cell A may be referred to as a source cell, and the logical cell A2 may be referred to as a source logical cell. Optionally, cell information of the cell A may be cell information of the $1^{st}$ logical cell A1.

It may be understood that, in this embodiment of this application, an access network device to which a logical cell belongs may be a CU, or may be in another form. This is not specifically limited in this embodiment of this application.

When the cell B is a shared cell, an example in which the cell B includes a logical cell B1 and a logical cell B2 is used. It is assumed that the logical cell B1 is a $1^{st}$ logical cell of the cell B, the logical cell B2 is a logical cell selected by the terminal device in the cell B, and the logical cell B1 and the logical cell B2 belong to different access network devices. In this case, after the terminal device is handed over from the cell A to the cell B, in a scenario in which an RLF occurs in the cell B soon, it may be understood that the RLF occurs on the terminal device in the logical cell B2 of the cell B. The cell B may be referred to as a failed cell, and the logical cell B2 may be referred to as a failed logical cell. In a scenario in which an HOF occurs in a process in which the terminal device is handed over from the cell A to the cell B, the cell B may be referred to as a failed cell, and the logical cell B2 may be referred to as a failed logical cell. Optionally, cell information of the cell B may be cell information of the $1^{st}$ logical cell B1.

When the cell C is a shared cell, an example in which the cell C includes a logical cell C1 and a logical cell C2 is used. It is assumed that the logical cell C1 is a $1^{st}$ logical cell of the cell C, the logical cell C2 is a logical cell selected by the terminal device in the cell C, and the logical cell C1 and the logical cell C2 belong to different access network devices. In this case, in a scenario in which an RLF occurs in the cell A after the terminal device is handed over from the cell C to the cell A and maintains a connection to the cell A for a period of time, the cell C may be referred to as a source cell, and the logical cell C2 may be referred to as a source logical cell. Optionally, cell information of the cell C may be cell information of the $1^{st}$ logical cell C1.

Based on the foregoing descriptions, in this embodiment of this application, the source logical cell may be a logical cell in which the terminal device is located when the terminal device receives the handover command last time or for the previous time. Receiving the handover command "last time" or "for the previous time" may mean that before a connection failure occurs, the terminal device last receives the handover command. It may be understood that the source logical cell is a logical cell selected by the terminal device in the source cell, in other words, the source logical cell is a logical cell on which the terminal device camps or that the terminal device accesses in the source cell.

In this embodiment of this application, in a scenario in which a type of the connection failure is an RLF, the failed logical cell is a logical cell in which the RLF is detected. In a scenario in which a type of the connection failure is an HOF, the failed logical cell is a target logical cell in which the HOF occurs. It may be understood that the failed logical cell is a logical cell selected by the terminal device in the failed cell, in other words, the failed logical cell is a logical cell on which the terminal device camps or that the terminal device accesses in the failed cell.

S602: The terminal records a first report.

The first report is used to describe a case in which the connection failure occurs on the terminal device.

Optionally, the first report may have another name, for example, an RLF report. The name of the first report is not specifically limited in this embodiment of this application.

The first report includes cell information of a first logical cell. Alternatively, the first report includes a PLMN identifier of a first logical cell and cell information of a second logical cell. The first logical cell includes a source logical cell and/or a failed logical cell in which the connection failure occurs. When the first logical cell includes the source logical cell, the second logical cell includes a $1^{st}$ logical cell that shares a same physical cell with the source logical cell. When the first logical cell includes the failed logical cell, the second logical cell includes a $1^{st}$ logical cell that shares a same physical cell with the failed logical cell. The physical cell shared with the source logical cell may be referred to as a source cell. In other words, when the first logical cell includes the source logical cell, the second logical cell includes the $1^{st}$ logical cell of the source cell. The physical cell shared with the failed logical cell may be referred to as a failed cell. In other words, when the first logical cell includes the failed logical cell, the second logical cell includes the $1^{st}$ logical cell of the failed cell.

Optionally, when the first report includes the PLMN identifier of the first logical cell and the cell information of the second logical cell, the first report may further include cell identifier information of the first logical cell. In other words, the first report may include the cell information of the second logical cell, the PLMN identifier of the first logical cell, and the cell identifier information of the first logical cell. In other words, the first report may include the cell information of the second logical cell and the cell information of the first logical cell.

Optionally, the terminal device may determine whether the source logical cell is the same as the $1^{st}$ logical cell of the source cell. If the source logical cell and the $1^{st}$ logical cell are different, the first report includes cell information of the source logical cell. Alternatively, the first report includes a PLMN identifier of the source logical cell and cell information of the $1^{st}$ logical cell of the source cell. If the source logical cell and the $1^{st}$ logical cell are the same, the first report may not include cell information or a PLMN identifier of the source logical cell. In other words, the first report includes cell information of the $1^{st}$ logical cell of the source cell but does not include the cell information or the PLMN identifier of the source logical cell.

Similarly, the terminal device may alternatively determine whether the failed logical cell is the same as the $1^{st}$ logical cell of the failed cell. If the failed logical cell and the $1^{st}$ logical cell are different, the first report includes cell information of the failed logical cell. Alternatively, the first report includes information of a PLMN of the failed logical cell and the $1^{st}$ logical cell of the failed cell. If the failed logical cell and the $1^{st}$ logical cell are the same, the first report may not include cell information or a PLMN identifier of the failed logical cell, but include cell information of the $1^{st}$ logical cell of the failed cell.

Optionally, the terminal device may alternatively skip determining whether the source logical cell is the same as the $1^{st}$ logical cell of the source cell and whether the failed logical cell is the same as the $1^{st}$ logical cell of the failed cell. The first report includes the cell information of the first logical cell by default, or the first report includes the PLMN identifier of the first logical cell and the cell information of the second logical cell by default. In this scenario, when the source logical cell and the $1^{st}$ logical cell of the source cell are the same, the first report includes two groups of same cell information of the $1^{st}$ logical cell of the source cell, or two same PLMN identifiers of the $1^{st}$ logical cell of the source cell. When the failed logical cell and the $1^{st}$ logical cell of the failed cell are the same, the first report includes two groups of same cell information of the $1^{st}$ logical cell of the failed cell, or two same PLMN identifiers of the $1^{st}$ logical cell of the failed cell.

Optionally, the first report may further include one or more of a type (for example, an RLF, an HOF, or another type) of the connection failure, cell information of a reestablishment cell, a C-RNTI of the terminal device, a measurement result of a serving cell and/or a neighboring cell when the connection failure occurs, and a security verification parameter. The security verification parameter may be, for example, short message authentication code for integrity (short MAC-I). When the type of the connection failure is an HOF, the C-RNTI of the terminal device may be a C-RNTI of the terminal device in the source logical cell. When the type of the connection failure is an RLF, the C-RNTI of the terminal device may be a C-RNTI of the terminal device in the failed logical cell.

Optionally, the first report may further include information related to random access. In an example, the random access information may include at least one of the following plurality of information elements: locationAndBandwidth: indicating a frequency domain position and a bandwidth of a bandwidth part (BWP) corresponding to a resource used by the terminal device to perform random access; subcarrierSpacing: indicating a subcarrier spacing of a BWP corresponding to a resource used by the terminal device to perform random access; msg1-FrequencyStart: indicating a frequency resource start position of a physical random access channel (PRACH) resource, or representing a lowest resource block (RB) index of a configured PRACH frequency domain resource in an initial BWP: msg1-SubcarrierSpacing: indicating a subcarrier spacing of a PRACH resource; and msg1-FDM: indicating a quantity of PRACH transmission occasions of frequency division multiplexing (FDM) in a same time instance.

Optionally, in different implementation scenarios of this embodiment of this application, the first logical cell and the second logical cell are also different. For example, the scenario in step S601 is used as an example.

Scenario 1: After the terminal device is handed over from the cell A to the cell B, an RLF occurs in the cell B.

In this scenario, the following cases exist.

Case 1: The cell A is a shared cell, and the cell B is a shared cell. After the terminal device is handed over from the logical cell A2 of the cell A to the logical cell B2 of the cell B, the RLF occurs in the cell B2 soon. In this case, the source logical cell is the cell A2, and the failed logical cell is the logical cell in which the RLF is detected, namely, the cell B2. In other words, the first logical cell includes the logical cell A2 and the logical cell B2, and the second logical cell includes the logical cell A1 and the logical cell B1. For example, in this case, in an implementation, the first report includes cell information of the logical cell A2 and cell information of the logical cell B2. In another implementation, the first report includes a PLMN identifier of the logical cell A2 and cell information of the logical cell A1, and a PLMN identifier of the logical cell B2 and cell information of the logical cell B1. In still another implementation, the first report includes cell information of the logical cell A1, cell information of the logical cell A2, cell information of the logical cell B1, and cell information of the logical cell B2.

Case 2: The cell A is a non-shared cell, and the cell B is a shared cell. After the terminal device is handed over from the cell A to the logical cell B2 of the cell B, the RLF occurs in the cell B2 soon. In this case, there is no source logical cell. The cell A is the source cell, and the failed logical cell is the logical cell in which the RLF is detected, namely, the cell B2. In other words, the first logical cell is the logical cell B2, and the second logical cell is the logical cell BL.

Case 3: The cell A is a shared cell, and the cell B is a non-shared cell. After the terminal device is handed over from the logical cell A2 of the cell A to the cell B, the RLF occurs in the cell B soon. In this case, there is no failed logical cell. The cell B is the cell in which the RLF is detected (namely, the failed cell), and the cell A2 is the source logical cell. In other words, the first logical cell is the logical cell A2, and the second logical cell is the logical cell A1.

Scenario 2: An RLF occurs on the terminal device in the cell A.

In this scenario, the following cases exist.

Case 1: The cell C is a shared cell, and the cell A is a shared cell. The terminal device is handed over from the logical cell C2 of the cell C to the logical cell A2 of the cell A, and the RLF occurs in the logical cell A2 after a period of time (for example, long time). In this case, the source logical cell is the cell C2, and the failed logical cell is the logical cell in which the RLF is detected, namely, the cell A2. In other words, the first logical cell includes the logical cell A2 and the logical cell C2, and the second logical cell includes the logical cell A1 and the logical cell C1.

Case 2: The cell C is a non-shared cell, and the cell A is a shared cell. The terminal device is handed over from the cell C to the logical cell A2 of the cell A, and the RLF occurs in the logical cell A2 after a period of time (for example, long time). In this case, there is no source logical cell. The cell C is the source cell, and the failed logical cell is the logical cell in which the RLF is detected, namely, the cell A2. In other words, the first logical cell is the logical cell A2, and the second logical cell is the logical cell A1.

Case 3: The cell C is a shared cell, and the cell A is a non-shared cell. The terminal device is handed over from the logical cell C2 of the cell C to the cell A. and the RLF occurs in the cell A after a period of time (for example, long time). In this case, there is no failed logical cell. The cell A is the cell in which the RLF is detected (namely, the failed cell), and the cell C2 is the source logical cell. In other words, the first logical cell is the logical cell C2, and the second logical cell is the logical cell C1.

Case 4: The terminal device is connected to the cell A when performing initial connection, and the cell A is a shared cell. Specifically, the terminal device is connected to the logical cell A2 of the cell A. In this case, there is no source logical cell, and the failed logical cell is the logical cell in which the RLF is detected, namely, the cell A2. In other words, the first logical cell is the logical cell A2, and the second logical cell is the logical cell A1.

Scenario 3: An HOF occurs in a process in which the terminal device is handed over from the cell A to the cell B.

In this scenario, the following cases exist.

Case 1: The cell A is a shared cell, and the cell B is a shared cell. The HOF occurs in a process in which the terminal device is handed over from the logical cell A2 of the cell A to the logical cell B2 of the cell B. In this case, the source logical cell is the cell A2, and the failed logical cell is the target logical cell in which the HOF occurs, namely, the cell B2. In other words, the first logical cell includes the logical cell A2 and the logical cell B2, and the second logical cell includes the logical cell A1 and the logical cell BL.

Case 2: The cell A is a non-shared cell, and the cell B is a shared cell. The HOF occurs in a process in which the terminal device is handed over from the cell A to the logical cell B2 of the cell B. In this case, there is no source logical cell. The cell A is the source cell, and the failed logical cell is the target logical cell in which the HOF occurs, namely, the cell B2. In other words, the first logical cell is the logical cell B2, and the second logical cell is the logical cell B1.

Case 3: The cell A is a shared cell, and the cell B is a non-shared cell. The HOF occurs in a process in which the terminal device is handed over from the logical cell A2 of the cell A to the cell B. In this case, there is no failed logical cell. The cell B is a target cell (namely, the failed cell) in which the HOF occurs, and the cell A2 is the source logical cell. In other words, the first logical cell is the logical cell A2, and the second logical cell is the logical cell A1.

S603: The terminal device sends the first report.

Optionally, the terminal device may send the first report to a first access network device, where the first access network device is an access network device to which the source logical cell belongs. Alternatively, the terminal device may send the first report to a second access network device, where the second access network device is an access network device to which the failed logical cell belongs. Alternatively, the terminal device may send the first report to a third access network device, where the third access network device may be, for example, an access network device to which a reestablishment cell or a cell to which a connection is established belongs. The third access network device may be the same as or different from the first access network device or the second access network device. In this embodiment of this application, that the third access network device is different from the first access network device and the second access network device is used for description.

Based on this solution, a connection failure rate of the terminal device in a RAN sharing scenario can be reduced, and a handover success rate can be improved. For example, because the first report includes the cell information of the source logical cell and/or the cell information of the failed logical cell, when the access network device that receives the first report from the terminal device is the third access network device, the third access network device may send, based on the cell information of the source logical cell and/or the cell information of the failed logical cell, the first report to the access network device to which the source logical cell belongs and/or the access network device to which the failed logical cell belongs, so that the access network devices optimize a mobility-related parameter, to reduce the connection failure rate of the terminal device, and improve the handover success rate. Alternatively, because the first report includes the PLMN identifier of the source logical cell and/or the PLMN identifier of the failed logical cell, and the cell information of the second logical cell, when the access network device that receives the first report from the terminal device is the third access network device, the third access network device may first send, based on the cell information of the second logical cell, the first report to an access network device to which the second logical cell belongs, so that the access network device to which the second logical cell belongs sends, based on the PLMN identifier of the first logical cell, the first report to the access network device to which the first logical cell belongs. For example, the access network device to which the second logical cell belongs determines the cell information of the first logical cell based on the PLMN identifier of the first logical cell and a stored cell information list, determines, based on the cell information of the first logical cell, the access network device to which the first logical cell belongs, and sends the first report to the access network device to which the first logical cell belongs, so that the access network device to which the first logical cell belongs optimizes a mobility-related parameter, to reduce the connection failure rate of the terminal device, and improve the handover success rate.

Figure 7:
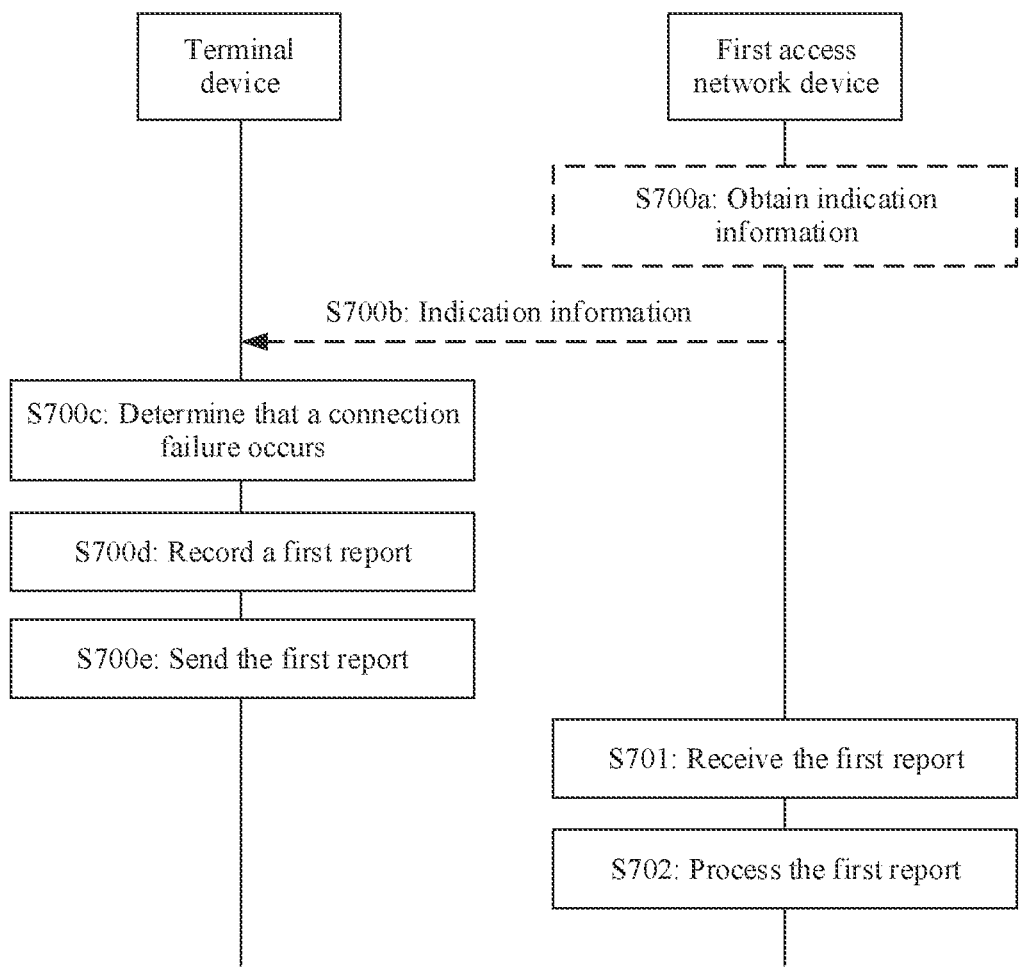
FIG. 7 is a schematic flowchart 2 of a communication method according to an embodiment of this application.

In the embodiment shown in FIG. 6, the method in embodiments of this application is described from a perspective of the terminal device. The following describes the method from a perspective of an access network device. FIG. 7 shows another communication method according to an embodiment of this application. The communication method includes the following steps.

S701: A first access network device receives a first report.

The first access network device is an access network device to which a source logical cell belongs. The first access network device may receive the first report from a terminal device, or may receive the first report from another access network device. Forwarding of the first report is described in a subsequent embodiment, and details are not described herein.

S702: The first access network device processes the first report.

Optionally, that the first access network device processes the first report may include: The first access network device parses the first report, and optimizes a mobility-related parameter of the source logical cell based on the first report.

It may be understood that, in a delayed handover scenario, to be specific, the terminal device is handed over from the source logical cell to a failed logical cell, and a connection failure, for example, an RLF, occurs after the terminal device is connected to the failed logical cell for long time, the method in this embodiment of this application does not include S701 and S702. Alternatively, in a scenario in which there is no source logical cell, the method in this embodiment of this application may not include steps performed by the first access network device.

In an implementation scenario of this embodiment of this application, before step S701, the method further includes step S700$a$ to step S700$e$.

S700$a$: The first access network device obtains indication information.

The indication information includes first indication information and/or second indication information. The first indication information indicates the terminal device to record cell information or a PLMN identifier of the source logical cell when the connection failure occurs. Alternatively, the first indication information indicates the terminal device to record cell information or a PLMN identifier of the source logical cell when the source logical cell is different from a $1^{st}$ logical cell of a source cell. The second indication information indicates the terminal device to record cell information or a PLMN identifier of the failed logical cell in which the connection failure occurs. Alternatively, the second indication information indicates the terminal device to record, when the failed logical cell is different from a $1^{st}$ logical cell of a failed cell, cell information or a PLMN identifier of the failed logical cell in which the connection failure occurs.

It may be understood that when the source cell is a shared cell in the scenario in this embodiment of this application, the indication information may include the first indication information. When the failed cell is a shared cell in the scenario in this embodiment of this application, the indication information may include the second indication information.

Optionally, for a representation manner of the first indication information, in an example, the first indication information may be represented by using a first field. When a value of the first field is a first value, it may indicate that the first indication information indicates the terminal device to record the cell information of the source logical cell when the connection failure occurs. Alternatively, when the value of the first field is a second value, it may indicate that the first indication information indicates the terminal device to record the PLMN identifier of the source logical cell when the connection failure occurs. Alternatively, when the value of the first field is a third value, it may indicate that the terminal device does not need to record the cell information or the PLMN identifier of the source logical cell.

In another example, when the value of the first field is a fourth value, the terminal device is indicated to record the cell information or the PLMN identifier of the source logical cell when the connection failure occurs. When the value of the first field is a fifth value, it indicates that the terminal device does not need to record the cell information or the PLMN identifier of the source logical cell.

In still another example, the first indication information may be indicated by using a first field. When a message sent by the first access network device to the terminal device includes the first field, the terminal device is indicated to record the cell information or the PLMN identifier of the source logical cell when the connection failure occurs. When the message sent by the first access network device to the terminal device does not include the first field, it indicates that the terminal device does not need to record the cell information or the PLMN identifier of the source logical cell.

Optionally, for a representation manner of the second indication information, refer to descriptions of the representation manner of the first indication information. Details are not described herein again.

Optionally, that the first access network device obtains indication information may include: The first access network device generates the indication information. Alternatively, when the indication information includes the second indication information, that the first access network device obtains indication information may include: The first access network device receives the second indication information from a second access network device. The second access network device is an access network device to which the failed logical cell belongs. In this case, the first indication information may be generated by the first access network device. In other words, before step S700$a$, the method in this embodiment of this application may further include: The second access network device obtains the second indication information.

In this case, step S700$a$ may include: The second access network device sends the second indication information to the first access network device. Correspondingly, the first access network device receives the second indication information from the second access network device.

Optionally, before the second access network device obtains the second indication information, the second access network device may further obtain capability information of the terminal device. The capability information indicates whether the terminal device supports recording of cell information or a PLMN identifier of a logical cell selected by the terminal device in a shared cell. When the capability information indicates that the terminal device supports recording of the cell information or the PLMN identifier of the logical cell selected by the terminal device in the shared cell, the second indication information is obtained.

Optionally, after the terminal device accesses the second access network device, the second access network device may alternatively send the second indication information to the terminal device. For a representation manner of the second indication information obtained by the second access network device, refer to the descriptions of the representation manner of the first indication information. Details are not described herein again. In this scenario, in step S701, the indication information obtained by the first access network device may not include the second indication information. To be specific, the second access network device sends the second indication information to the terminal device, and the first access network device sends the first indication information to the terminal device. In other words, the first indication information and the second indication information that are received by the terminal device may be from different access network devices.

S700b: The first access network device sends the indication information to the terminal device. Correspondingly, the terminal device receives the indication information from the first access network device.

Optionally, before the first access network device sends the indication information to the terminal device, the first access network device may further obtain the capability information of the terminal device. The capability information indicates whether the terminal device supports recording of the cell information or the PLMN identifier of the logical cell selected by the terminal device in the shared cell. When the capability information indicates that the terminal device supports recording of the cell information or the PLMN identifier of the logical cell selected by the terminal device in the shared cell, the indication information is sent to the terminal device.

Optionally, that the first access network device or the second access network device obtains capability information of the terminal device may include: The first access network device or the second access network device receives the capability information that is from the terminal device, a core network device, or another access network device and that is of the terminal device. In other words, the first access network device or the second access network device may obtain the capability information of the terminal device from the terminal device, the core network device, or the another access network device.

It may be understood that steps S700a and S700b may be separately implemented, and do not depend on other steps in this embodiment of this application.

Steps S700c to S700e are respectively similar to steps S601 to S603 in the embodiment shown in FIG. 6. A difference lies in that, in step S700d of this embodiment, that the terminal device records a first report may include: The terminal device records the first report based on the indication information. To be specific, when the indication information includes the first indication information, the terminal device records the cell information or the PLMN identifier of the source logical cell based on the first indication information. When the indication information includes the second indication information, the terminal device records the cell information or the PLMN identifier of the failed logical cell based on the second indication information.

Based on this solution, a connection failure rate of the terminal device in a RAN sharing scenario can be reduced, and a handover success rate can be improved. For example, because the first access network device sends the indication information to the terminal device, the terminal device may record the first report based on the indication information when the connection failure occurs. For example, the first report includes the cell information of the first logical cell, or includes the PLMN identifier of the first logical cell and the cell information of the second logical cell, so that the first report can be finally sent to the access network device to which the source logical cell belongs and/or an access network device to which the failed logical cell belongs. Therefore, the access network devices optimize a mobility-related parameter, to reduce the connection failure rate of the terminal device, and improve the handover success rate.

Figure 8:
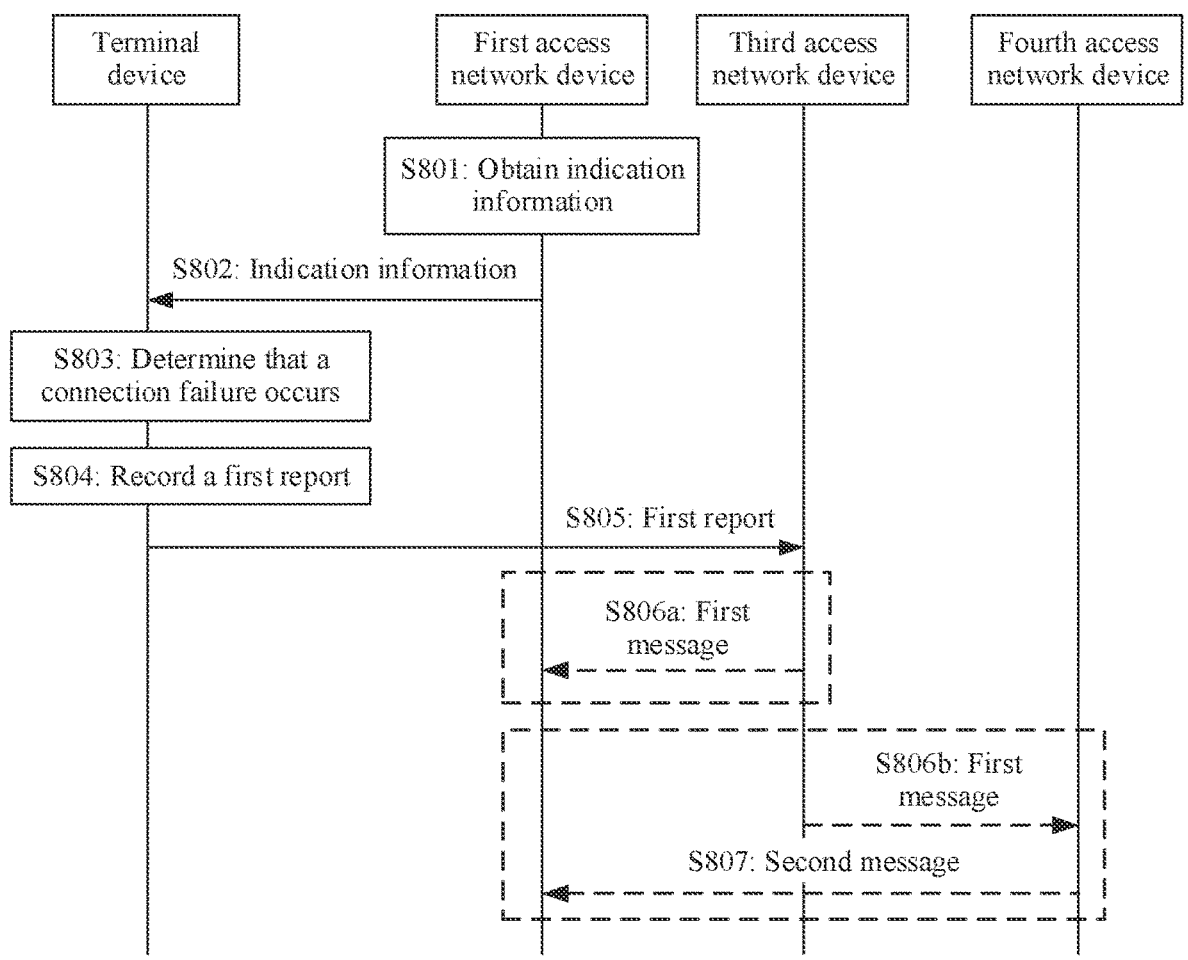
FIG. 8 is a schematic flowchart 3 of a communication method according to an embodiment of this application.

The following describes transmission of the first report in the embodiment shown in FIG. 6 or FIG. 7 by using an example in which the terminal device sends the first report to the third access network device and the first logical cell includes the source logical cell. Based on the embodiment shown in FIG. 7, as shown in FIG. 8, the method includes the following steps.

S801 to S804 are respectively similar to S700a to S700d shown in FIG. 7, and details are not described herein again.

S805: The terminal device sends the first report to the third access network device. Correspondingly, the third access network device receives the first report from the terminal device.

It may be understood that when the terminal device sends the first report in an inter-RAT manner, for example, the terminal device sends, in a first system or a first-standard cell, the first report of a second system or a second standard, using an example in which in step S805, the third access network device is an access network device in the first system or the first standard, the terminal device further sends cell information of the second system or the second standard to the third access network device, so that the third access network device forwards the first report to an access network device to which the second system or a second-standard cell belongs. For example, if a type of the connection failure is an RLF, the cell information of the second system or the second standard may be cell information of a second system or a second-standard cell in which the RLF occurs. If the type of the connection failure is an HOF, the cell information of the second system or the second standard may be cell information of a second system or a second-standard cell in which a handover command is last received before the connection failure. In the following embodiments of this application, an example in which the first report is sent in a same system or a same standard is used for description. To be specific, the terminal device sends the first report of a system or a standard in the system or the standard.

Optionally, in step S805, the terminal device may further send, to the third access network device, type information of the first report. The type information indicates a type of the first report. The type of the first report may be, for example, an LTE RLF report, an NR RLF report, an eLTE RLF report, or a report in another system/standard. The type information of the first report may be used by an access network device that needs to decode the first report to determine an encoding format of the first report, so as to decode the first report.

Optionally, after receiving the first report, the third access network device may determine, based on content included in the first report, to send a first message to the first access network device or a fourth access network device.

In this embodiment of this application, an example in which the type of the connection failure is an HOF is used for description. The fourth access network device is an access network device to which a second logical cell belongs. In this scenario, the fourth access network device is an access network device to which a $1^{st}$ logical cell of a source cell belongs. For example, when the source logical cell is the cell A2, and the logical cell A1 is the $1^{st}$ logical cell that shares the source cell A with the cell A2, the first access network device is an access network device to which the cell A2 belongs, and the fourth access network device is an access network device to which the logical cell A1 belongs. For example, the first access network device may be understood as the CU 2 shown in FIG. 2e, and the fourth access network device may be understood as the CU 1 shown in FIG. 2e.

The first message includes the first report. Optionally, the first message may further include the type information of the first report.

Optionally, when determining to send the first message to the first access network device, the third access network device performs the following step S806a. When determining to send the first message to the fourth access network device, the third access network device performs the following step S806b.

S806a: The third access network device sends the first message to the first access network device. Correspondingly, the first access network device receives the first message from the third access network device.

Optionally, that after receiving the first report, the third access network device determines, based on content included in the first report, to send a first message to the first access network device may include: When the type that is included in the first report and that is of the connection failure is an HOF, and the first report includes the cell information of the first logical cell but does not include the cell information of the second logical cell, the third access network device determines to send the first message to the first access network device. Alternatively, when the type that is included in the first report and that is of the connection failure is an HOF, and the first report includes the cell information of the first logical cell and the cell information of the second logical cell, the third access network device determines to send the first message to the first access network device.

Optionally, after receiving the first message, the first access network device may determine the encoding format of the first report based on the type information of the first report, to decode, based on the encoding format, the first report included in the first message, and further adjust, based on the first report, a mobility-related parameter configured by the first access network device.

Optionally, when the first access network device is in a separated form including a CU and a DU, the CU in the first access network device may receive the first report. Optionally, the CU may further send, to the DU, a part or all of information included in the first report. Optionally, if the CU may be divided into a CU-CP and a CU-UP, the method may further include: The CU-CP sends, to the CU-UP, a part or all of information included in the first report. For example, the part of information in the first report may be information related to random access.

Optionally, when there is an interface (for example, an X2 interface or an Xn interface) that can be used for direct communication between the third access network device and the first access network device, the third access network device may send the first message to the first access network device through the interface. In this case, the first message may be, for example, at least one of a failure indication (FAILURE INDICATION or RLF INDICATION) message, a handover report (HANDOVER REPORT) message, or another message.

Optionally, when there is no interface that can be used for direct communication between the third access network device and the first access network device, the third access network device may send the first message to the first access network device by using a core network device. For example, the third access network device sends the first message to the core network device through an SI interface or an NG interface, and the core network device forwards the first message to the first access network device. In this case, the first message may be, for example, at least one of an uplink RAN configuration transfer (UPLINK RAN CONFIGURATION TRANSFER) message, a downlink RAN configuration transfer (DOWNLINK RAN CONFIGURATION TRANSFER) message, a base station configuration transfer (eNB CONFIGURATION TRANSFER) message, a core network device configuration transfer (MME CONFIGURATION TRANSFER), or another message.

S806b: The third access network device sends the first message to the fourth access network device. Correspondingly, the fourth access network device receives the first message from the third access network device.

Optionally, that after receiving the first report, the third access network device determines, based on content included in the first report, to send a first message to the fourth access network device may include: When the type that is included in the first report and that is of the connection failure is an HOF, and the first report includes information of the PLMN of the first logical cell and the second logical cell, the third access network device determines to send the first message to the fourth access network device. Alternatively, when the type that is included in the first report and that is of the connection failure is an HOF, and the first report includes the cell information of the first logical cell and the cell information of the second logical cell, the third access network device determines to send the first message to the fourth access network device.

For a manner in which the third access network device sends the first message to the fourth access network device, refer to related descriptions of sending, by the third access network device, the first message to the first access network device in step S806a. Details are not described herein again.

It may be understood that the foregoing implementation in which the third access network device sends the first message to the first access network device is applicable to message exchange between any two access network devices in embodiments of this application. For an implementation of an access network device that sends a message, refer to related descriptions of the third access network device in step S806a. For an implementation of an access network device that receives a message, refer to descriptions of the first access network device in step S806a.

Optionally, after receiving the first message, the fourth access network device may process the first report included in the first message.

For example, the first report includes the PLMN identifier of the source logical cell and cell information of the $1^{st}$ logical cell of the source cell, or the first report includes the cell information of the source logical cell and cell information of the $1^{st}$ logical cell. The fourth access network device may determine whether the PLMN identifier that is in the first report and that is of the source logical cell is the same as the PLMN identifier of the $1^{st}$ logical cell, or whether the cell information of the source logical cell is the same as the cell information of the $1^{st}$ logical cell.

If the PLMN identifier that is in the first report and that is of the source logical cell is the same as the PLMN identifier of the $1^{st}$ logical cell or the cell information of the source logical cell is the same as the cell information of the $1^{st}$ logical cell, the source logical cell is the same as the $1^{st}$ logical cell of the source cell, and the fourth access network device is an access network device to which the source logical cell belongs. That the fourth access network device processes the first report may be: The fourth access network device optimizes a mobility-related parameter of the source logical cell based on the first report. In this case, the fourth access network device may further determine, based on the C-RNTI of the terminal device and/or the security verification parameter (for example, the short MAC-I) that are/is included in the first report, whether the first report is sent to the fourth access network device. For example, the fourth access network device may compare the C-RNTI of the terminal device and/or the short MAC-I that are/is included in the first report with a C-RNTI of the terminal device in the $1^{st}$ logical cell of the source cell and short MAC-I that are/is stored in the fourth access network device. If the C-RNTIs and/or the short MAC-I that are/is included in the first report and the C-RNTIs and/or the short MAC-I that are/is stored in the fourth access network device are the same, the fourth access network device determines that the first report is sent to the fourth access network device. After determining that the first report is sent to the fourth access network device, the fourth access network device may optimize the mobility-related parameter of the source logical cell based on the first report.

If the C-RNTIs and/or the short MAC-I that are/is included in the first report and the C-RNTIs and/or the short MAC-I that are/is stored in the fourth access network device are different, the fourth access network device may determine, based on the PLMN identifier of the source logical cell or the cell information about the source logical cell included in the first report, the access network device to which the source logical cell belongs, namely, the first access network device, and then may perform the following step S807. For example, the fourth access network device may determine the cell information of the source logical cell based on the PLMN identifier of the source logical cell and a stored cell information list broadcast by the source cell, and determine, based on the cell information of the source logical cell, the access network device to which the source logical cell belongs. Alternatively, for example, when the first report includes the cell information of the source logical cell, the fourth access network device may determine, based on the cell information that is included in the first report and that is of the source logical cell, the access network device to which the source logical cell belongs.

S807: The fourth access network device sends a second message to the first access network device. Correspondingly, the first access network device receives the second message from the fourth access network device.

Optionally, the second message may include the first report. Optionally, the second message may further include the type information of the first report.

Optionally, for an operation performed after the first access network device obtains the first report, refer to descriptions in step S806a. Details are not described herein again.

Based on this solution, the first report may be finally sent to the access network device to which the source logical cell belongs, so that the access network device can optimize a mobility-related parameter, to reduce the connection failure rate of the terminal device, and improve the handover success rate. In another implementation, when the type of the connection failure in a premature handover or a wrong handover is an RLF, and the first logical cell includes the failed logical cell, the third access network device may determine to send a third message to an access network device (namely, the second access network device) to which the failed logical cell belongs or a fifth access network device.

In this embodiment of this application, the fifth access network device is an access network device to which the second logical cell belongs. In a scenario in which an RLF occurs on the terminal device, the fifth access network device is an access network device to which the $1^{st}$ logical cell that shares a same physical cell with the failed logical cell belongs, namely, an access network device to which the $1^{st}$ logical cell of the failed logical cell belongs. For example, when the failed logical cell is the cell B2, and the logical cell B1 is the $1^{st}$ logical cell that shares the failed cell B with the cell B2, the second access network device is an access network device to which the logical cell B2 belongs, and the fifth access network device is an access network device to which the logical cell B1 belongs.

Optionally, for a manner in which the third access network device determines to send the third message to the second access network device or the fifth access network device, refer to descriptions of determining to send the first message to the first access network device or the fourth access network device in the foregoing steps S806a and S806b. Details are not described herein again. Optionally, if the third access network device determines to send the third message to the fifth access network device, the fifth access network device may determine whether to optimize a mobility-related parameter of the second logical cell based on the first report, or the fifth access network device may further send a fourth message to the second access network device. Refer to descriptions in the foregoing steps S806b and S807, details are not described herein again.

Optionally, after receiving the third message or the fourth message, the second access network device may determine to send a fifth message to the first access network device or the fourth access network device. For a determining manner, refer to descriptions of determining, by the third access network device, to send the first message to the first access network device or the fourth access network device in the foregoing steps S806a and S806b, details are not described herein again. Optionally, if the second access network device sends the fifth message to the fourth access network device, the fourth access network device may further send the second message to the first access network device. Refer to descriptions in step S807, details are not described herein again.

Optionally, the third message, the fourth message, or the fifth message includes the first report. Optionally, the third message or the fourth message may further include the type information of the first report. Optionally, the fifth message may further include at least one of the following information: handover type information (for example, a premature handover, a delayed handover, or an inter-system and/or inter-RAT premature handover), a C-RNTI of the terminal device in the source logical cell, a mobility parameter related to a handover decision of the terminal device in the source logical cell, and the like.

Optionally, for an operation performed after the first access network device receives the first report, refer to related descriptions in step S806a. Details are not described herein again.

It may be understood that if the source cell is a non-shared cell, the first access network device and the fourth access network device may be understood as a same access network device. Correspondingly, steps related to the fourth access network device in the foregoing steps do not need to be performed. If the failed cell is a non-shared cell, the second access network device and the fifth access network device may be understood as a same access network device. Correspondingly, steps related to the fifth access network device in the foregoing steps do not need to be performed.

In an implementation of this embodiment of this application, descriptions of steps S806a to S807 are also applicable to forwarding of the first report in a delayed handover scenario. In the delayed handover scenario, the first access network device in step S806a to step S807 may be replaced with the second access network device (namely, the access network device to which the failed logical cell belongs), and the fourth access network device may be replaced with the fifth access network device (namely, the access network device to which the $1^{st}$ logical cell of the failed cell belongs).

Figure 9:
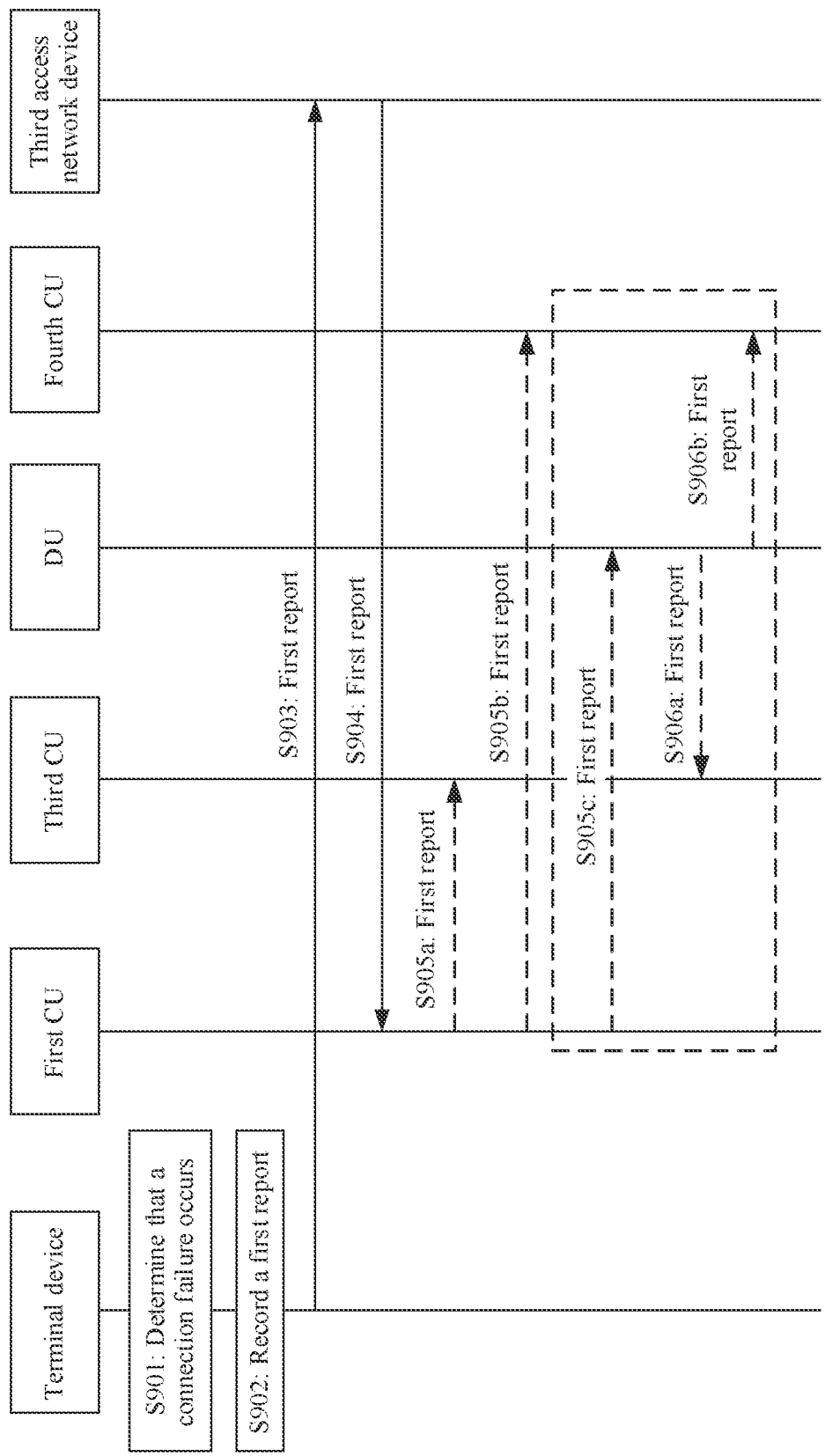
FIG. 9 is a schematic flowchart 4 of a communication method according to an embodiment of this application.

FIG. 9 shows still another communication method according to an embodiment of this application. In the method, an example in which an access network device to which a logical cell belongs is a CU is used. The communication method includes the following steps.

S901: A terminal device determines that a connection failure occurs.

The connection failure may be an RLF or an HOF. For a specific failure scenario, refer to related descriptions in the foregoing step S601. Details are not described herein again.

S902: The terminal records a first report.

The first report is used to describe a case in which the connection failure occurs on the terminal device. The first report includes a first identifier of the terminal device. In an HOF scenario, the first identifier is a C-RNTI of the terminal device in a source logical cell. In an RLF scenario, the first identifier is a C-RNTI of the terminal device in a logical cell in which an RLF is detected.

Optionally, the first report may further include cell information of a $1^{st}$ logical cell of a failed cell, and/or cell information of a $1^{st}$ logical cell of a source cell.

Optionally, the first report may further include one or more of a type (for example, an RLF, an HOF, or another type) of the connection failure, cell information of a reestablishment cell, and a measurement result of a serving cell and/or a neighboring cell when the connection failure occurs.

Optionally, after recording the first report, the terminal device may send the first report to a first CU, a second CU, or a third access network device. The first CU is a CU to which the $1^{st}$ logical cell of the source cell belongs. The second CU is a CU to which the $1^{st}$ logical cell of the failed cell belongs. The third access network device is an access network device different from the first CU and the second CU. In this embodiment of this application, an example in which the terminal device sends the first report to the third access network device is used for description. That is, the following step S903 is performed after step S902.

S903: The terminal device sends the first report to the third access network device. Correspondingly, the third access network device receives the first report from the terminal device.

Optionally, after receiving the first report, the third access network device may send the first report to the CU (namely, the second CU) to which the $1^{st}$ logical cell of the failed cell belongs, or may send the first report to the CU (namely, the first CU) to which the $1^{st}$ logical cell of the source cell belongs.

For example, in a scenario in which a type of the connection failure is an HOF, the third access network device sends the first report to the first CU. In a scenario in which the type of the connection failure is an RLF, the third access network device sends the first report to the second CU. The following uses an example in which the third access network device sends the first report to the first CU in an HOF scenario for description.

S904: The third access network device sends the first report to the first CU. Correspondingly, the first CU receives the first report from the third access network device.

Optionally, after receiving the first report, the third access network device may determine, based on the cell information of the $1^{st}$ logical cell of the source cell, the CU to which the logical cell belongs, and send the first report to the first CU. It may be understood that, in a scenario in which the type of the connection failure is an HOF, the first identifier included in the first report is the C-RNTI of the terminal device in the source logical cell. Therefore, after the first CU receives the first report, whether the terminal device is a terminal device managed by the first CU may be determined based on the C-RNTI that is included in the first report and that is of the terminal device in the source logical cell. For example, the first CU may store a C-RNTI of the terminal device in a logical cell managed by the first CU. After receiving the first report, the first CU searches the C-RNTI stored by the first CU for the C-RNTI of the terminal device in the source logical cell. If the C-RNTI of the terminal device in the source logical cell is not found, the first CU may determine that the terminal device is not a terminal device managed by the first CU. If the C-RNTI of the terminal device in the source logical cell is found, the first CU may optimize a mobility-related parameter corresponding to the terminal device.

When the terminal device is not a terminal device managed by the first CU, the method may subsequently include different steps in different implementation scenarios of embodiments of this application.

For example, in a possible implementation scenario, the first CU may further determine that a CU managing the terminal device (or a CU to which the source logical cell belongs) is a third CU, where the third CU and the first CU share a same DU. Therefore, the method further includes step S905a: The first CU sends the first report to the third CU. Correspondingly, the third CU receives the first report from the first CU. After receiving the C-RNTI of the terminal device in the source logical cell, and determining that the terminal device is a terminal device managed by the third CU, the third CU may optimize the mobility-related parameter of the terminal device.

Optionally, the first CU may compare the C-RNTI that is of the terminal device in the source logical cell and that is obtained by the first CU with the C-RNTI that is of the terminal device and that is from the third CU. When the two C-RNTIs are the same, the first CU may determine that the CU to which the source logical cell belongs is the third CU. Optionally, when the connection failure occurs on the terminal device, the third CU to which the source logical cell belongs may perceive the connection failure. For example, in a premature handover scenario in which the terminal device is handed over from the source logical cell to another cell, if the source logical cell receives a reestablishment request of the terminal device, the third CU may determine that a connection failure occurs. Alternatively, in a wrong handover scenario in which the terminal device is handed over from the source logical cell to another cell, if the third CU to which the source logical cell belongs does not receive a handover complete message from an access network device to which the another cell belongs, the third CU may determine that a connection failure occurs. Alternatively, the third CU may determine that an RLF occurs on a terminal device connected to the third CU. After perceiving the connection failure, the third CU may send, to the first CU, the C-RNTI of the terminal device in the source logical cell, so that after receiving the first report, the first CU may send the first report to the third CU based on the C-RNTI that is of the terminal device and that is from the third CU.

In another possible implementation scenario, after determining that the terminal device is not a terminal device managed by the first CU, the first CU may perform step S905b: The first CU sends the first report to a fourth CU. Correspondingly, the fourth CU receives the first report from the first CU. The fourth CU is at least one CU that is other than the first CU and that shares the same DU with the first CU. It may be understood that the fourth CU includes the CU to which the source logical cell belongs. Therefore, in this method, the first report may also be sent to the CU (for example, the third CU) to which the source logical cell belongs. To be specific, if a plurality of CUs share a same DU with the first CU, the first CU determines that the source logical cell is not a logical cell managed by the first CU, and cannot determine the CU to which the source logical cell belongs, the first CU may separately send the first report to the plurality of CUs. After receiving the first report, each of the plurality of CUs may determine, based on the C-RNTI that is in the source logical cell and that is included in the first report, whether the terminal device is a terminal device managed by the CU. If the terminal device is a terminal device managed by the CU, a mobility-related parameter of the terminal device may be optimized. If the terminal device is not a terminal device managed by the CU, the CU discards or ignores the first report.

In still another possible implementation scenario, after determining that the terminal device is not a terminal device managed by the first CU, the first CU may perform step S905c: The first CU sends the first report to a DU. Correspondingly, the DU receives the first report from the first CU. The DU is the DU shared by the first CU and one or more other CUs, and the one or more other CUs include the CU to which the source logical cell belongs.

Optionally, after the DU receives the first report from the first CU, if the DU may determine, based on the C-RNTI that is of the terminal device in the source logical cell and that is included in the first report, the CU to which the source logical cell belongs, for example, the DU stores a C-RNTI of the terminal device in each logical cell, and may further determine the CU to which the source logical cell belongs, the DU may perform step S906a: The DU sends the first report to the CU (namely, the third CU) to which the source logical cell belongs. After receiving the C-RNTI of the terminal device in the source logical cell, and determining that the terminal device is a terminal device managed by the third CU, the third CU may optimize the mobility-related parameter of the terminal device.

If the DU cannot determine the CU to which the source logical cell belongs, the DU may perform step S906b: The DU sends the first report to a CU (namely, the fourth CU), other than the first CU, of the plurality of CUs that share the DU, where the CU other than the first CU includes the CU to which the source logical cell belongs. Therefore, in this method, the first report may also be sent to the CU to which the source logical cell belongs. After receiving the first report, each of the plurality of CUs may determine, based on the C-RNTI that is in the source logical cell and that is included in the first report, whether the terminal device is a terminal device managed by the CU. If the terminal device is a terminal device managed by the CU, a mobility-related parameter of the terminal device may be optimized. If the terminal device is not a terminal device managed by the CU, the CU discards or ignores the first report.

Based on this solution, after the first report is transmitted to the CU to which the $1^{st}$ logical cell of the source cell belongs, the CU may continue to send the first report to the CU to which the source logical cell belongs, so that the CU to which the source logical cell belongs can adjust the mobility-related parameter configured by the CU, to reduce the connection failure rate of the terminal device, and improve the handover success rate.

In an implementation of this embodiment of this application, in an RLF scenario, for a method in which the third access network device sends the first report to the second CU, so that the second CU sends the first report to the CU to which the failed logical cell belongs, refer to the foregoing method in which the third access network device sends the first report to the first CU, so that the first CU sends the first report to the CU to which the source logical cell belongs. Details are not described herein again.

Optionally, in an RLF scenario of a premature handover or a wrong handover, after the first report is transmitted to the CU to which the failed logical cell belongs, the CU to which the failed logical cell belongs may send the first report and first information to the first CU. Optionally, the first information may further include at least one of the following information: handover type information (for example, a premature handover, a wrong handover, or an inter-system and/or inter-RAT premature handover), a C-RNTI of the terminal device in the source logical cell, a mobility parameter related to a handover decision of the terminal device in the source logical cell, and the like.

It may be understood that, in the RLF scenario, the first identifier that is of the terminal device and that is included in the first report is a C-RNTI of the terminal device in a logical cell in which the RLF is detected, and the CU to which the failed logical cell belongs may send, to the first CU, the C-RNTI of the terminal device in the source logical cell.

Optionally, after receiving the first report and the first information, the first CU may determine, based on the C-RNTI that is of the terminal device in the source logical cell and that is included in the first information, whether the terminal device is a terminal device managed by the first CU. Refer to related descriptions in step S904. Details are not described herein again.

Optionally, when the first CU determines that the terminal device is not a terminal device managed by the first CU, the first CU may further perform a step similar to step S905a, S905b, or S905c. A difference lies in that, when sending the first report, the first CU further sends the C-RNTI that is of the terminal device in the source logical cell and that is included in the first information. Optionally, the first CU may further send the handover type information, the mobility parameter related to the handover decision of the terminal device in the source logical cell, and the like that are included in the first information.

Based on this solution, after the first report is transmitted to the CU to which the $1^{st}$ logical cell of the failed cell belongs, the CU may continue to send the first report to the CU to which the failed logical cell belongs, so that the CU to which the failed logical cell belongs adjusts a mobility-related parameter configured for the CU. Alternatively, the CU to which the failed logical cell belongs sends the first report and the first information to the CU to which the $1^{st}$ logical cell of the source cell belongs, so that the first report can be finally sent to the CU to which the source logical cell belongs, and the CU to which the source failed logical cell belongs adjusts a mobility-related parameter configured for the CU, to reduce the connection failure rate of the terminal device, and improve the handover success rate.

It may be understood that the methods are applicable to a scenario in which different logical cells belong to different access network devices during RAN sharing, but shall not constitute any limitation on this application. This application is further applicable to another scenario.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments, methods and/or steps implemented by the terminal device may also be implemented by a component (for example, a chip or a circuit) that can be used in the terminal device, and methods and/or steps implemented by the access network device may also be implemented by a component (for example, a chip or a circuit) that can be used in the access network device.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the access network device in the foregoing method embodiments, or an apparatus including the foregoing access network device, or a component that can be used in the access network device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 10:
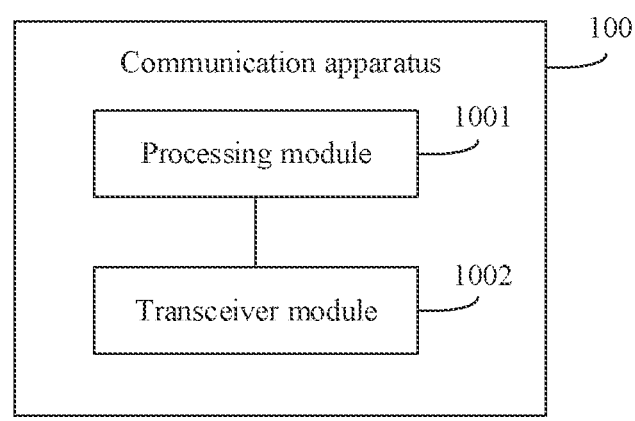
FIG. 10 is a schematic diagram of a structure of a communication apparatus according to an embodiment of this application.

For example, the communication apparatus implements the steps of the terminal device in the foregoing method embodiments. FIG. 10 is a schematic diagram of a structure of a communication apparatus 100. The communication apparatus 100 includes a processing module 1001 and a transceiver module 1002. The transceiver module 1002 may also be referred to as a transceiver unit, and is configured to implement a sending and/or receiving function, for example, may be a transceiver circuit, a transceiver machine, a transceiver, or a communications interface.

The transceiver module 1002 may include a receiving module and a sending module, which are respectively configured to perform receiving and sending steps performed by the terminal device in the foregoing method embodiments. The processing module 1001 may be configured to perform steps other than the receiving and sending steps performed by the terminal device in the foregoing method embodiments.

The processing module 1001 is configured to determine that a connection failure occurs. The processing module 1001 is further configured to record a first report. The first report includes cell information of a first logical cell, or the first report includes a PLMN identifier of a first logical cell and cell information of a second logical cell. The first logical cell includes a source logical cell and/or a failed logical cell in which the connection failure occurs. When the first logical cell includes the source logical cell, the second logical cell includes a $1^{st}$ logical cell that shares a same physical cell with the source logical cell. When the first logical cell includes the failed logical cell, the second logical cell includes a $1^{st}$ logical cell that shares a same physical cell with the failed logical cell. The transceiver module 1002 is configured to send the first report.

Optionally, the transceiver module 1002 is further configured to receive first indication information. The first indication information indicates the terminal device to record cell information or a PLMN identifier of the source logical cell. That the processing module 1001 is configured to record a first report may include: The processing module 1001 is configured to record the first report based on the first indication information.

Optionally, the transceiver module 1002 is further configured to receive second indication information. The second indication information indicates the terminal device to record cell information or a PLMN identifier of the failed logical cell. That the processing module 1001 is configured to record a first report may include: The processing module 1001 is configured to record the first report based on the second indication information.

All related content of the steps in the foregoing method embodiments may be cited in function descriptions of the corresponding functional modules. Details are not described herein again.

Optionally, the communication apparatus 100 may further include a storage module (not shown in FIG. 10), configured to store data and/or instructions. The processing module 1001 may read the data or the instructions in the storage module, to implement the methods corresponding to the foregoing embodiments.

It may be understood that the foregoing modules may be independently disposed, or may be integrated. This is not limited in this embodiment of this application.

In a possible implementation, the communication apparatus 100 is presented in an integrated form of function modules obtained through division. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 100 may be in a form of the terminal device 40 shown in FIG. 4.

For example, the processor 401 in the terminal device 40 shown in FIG. 4 may invoke the computer-executable instructions stored in the memory 402, to enable the terminal device 40 to perform the communication methods in the foregoing method embodiments.

Specifically, the processor 401 in the terminal device 40 shown in FIG. 4 may invoke the computer-executable instructions stored in the memory 402, to implement functions/implementation processes of the processing module 1001 and the transceiver module 1002 in FIG. 10. Alternatively, the processor 401 in the terminal device 40 shown in FIG. 4 may invoke the computer-executable instructions stored in the memory 402, to implement functions/implementation processes of the processing module 1001 in FIG. 10, and the transceiver 403 in the terminal device 40 shown in FIG. 4 may implement functions/implementation processes of the transceiver module 1002 in FIG. 10.

The communication apparatus 100 provided in this embodiment can perform the foregoing communication method. Therefore, for technical effects that can be achieved by the communication apparatus 100, refer to the foregoing method embodiments. Details are not described herein again.

Figure 11:
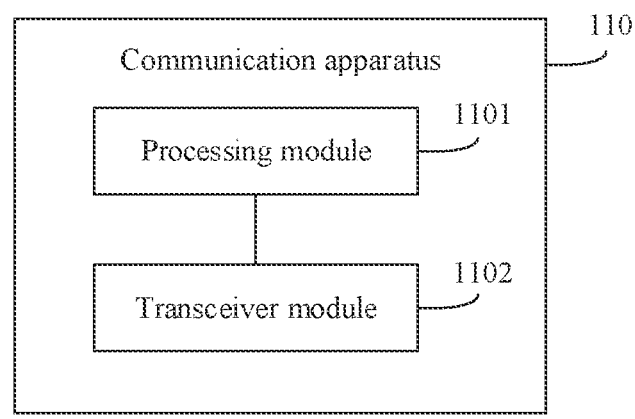
FIG. 11 is a schematic diagram of a structure of another communication apparatus according to an embodiment of this application.

Alternatively, for example, the communication apparatus implements the steps of the first access network device in the foregoing method embodiments. FIG. 11 is a schematic diagram of a structure of a communication apparatus 110. The communication apparatus 110 includes a processing module 1101 and a transceiver module 1102. The transceiver module 1102 may also be referred to as a transceiver unit, and is configured to implement a sending and/or receiving function, for example, may be a transceiver circuit, a transceiver machine, a transceiver, or a communications interface.

The transceiver module 1102 may include a receiving module and a sending module, which are respectively configured to perform receiving and sending steps performed by the terminal device in the foregoing method embodiments. The processing module 1101 may be configured to perform steps other than the receiving and sending steps performed by the terminal device in the foregoing method embodiments.

In a Possible Implementation:

The transceiver module 1102 is configured to receive a first report. The first report includes cell information of a first logical cell, or the first report includes a PLMN identifier of a first logical cell and cell information of a second logical cell. The first logical cell includes a source logical cell and/or a failed logical cell in which a connection failure occurs. When the first logical cell includes the source logical cell, the second logical cell includes a $1^{st}$ logical cell that shares a same physical cell with the source logical cell. When the first logical cell includes the failed logical cell, the second logical cell includes a $1^{st}$ logical cell that shares a same physical cell with the failed logical cell. The processing module 1101 is configured to process the first report.

Optionally, the processing module 1101 is further configured to obtain indication information. The transceiver module 1102 is further configured to send the indication information. The indication information includes first indication information and/or second indication information. The first indication information indicates the terminal device to record cell information or a public land mobile network PLMN identifier of the source logical cell when the connection failure occurs. The second indication information indicates the terminal device to record cell information or a PLMN identifier of the failed logical cell in which the connection failure occurs.

Optionally, when the indication information includes the second indication information, that the processing module 1101 is configured to obtain indication information may include: The processing module 1101 obtains the second indication information that is received by the transceiver module 1102 and that is from a second access network device. The second access network device is an access network device to which the failed logical cell belongs.

In Another Possible Implementation:

The transceiver module 1102 is configured to receive the first report. The first report is used to record a case in which a connection failure occurs in a terminal device. The processing module 1101 is configured to obtain a C-RNTI of the terminal device in a source logical cell. The processing module 1101 is further configured to determine, based on the C-RNTI of the terminal device in the source logical cell, that the terminal device is not a terminal device managed by the communication apparatus 110. The transceiver module 1102 is further configured to send the first report when the terminal device is not a terminal device managed by the communication apparatus 110.

All related content of the steps in the foregoing method embodiments may be cited in function descriptions of the corresponding functional modules. Details are not described herein again.

Optionally, the communication apparatus 110 may further include a storage module (not shown in FIG. 11), configured to store data and/or instructions. The processing module 1101 may read the data or the instructions in the storage module, to implement the methods corresponding to the foregoing embodiments.

It may be understood that the foregoing modules may be independently disposed, or may be integrated. This is not limited in this embodiment of this application.

In a possible implementation, the communication apparatus 110 is presented in an integrated form of function modules obtained through division. The "module" herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 110 may be in a form of the first access network device 30*b* shown in FIG. 4.

For example, the processor 301*a* in the first access network device 30*a* shown in FIG. 4 may invoke the computer-executable instructions stored in the memory 302*a*, to enable the first access network device 30*a* to perform the communication methods in the foregoing method embodiments.

Specifically, the processor 301*a* in the first access network device 30*a* shown in FIG. 4 may invoke the computer-executable instructions stored in the memory 302*a*, to implement functions/implementation processes of the processing module 1101 and the transceiver module 1102 in FIG. 11. Alternatively, the processor 301*a* in the first access network device 30*a* shown in FIG. 4 may invoke the computer-executable instructions stored in the memory 302*a*, to implement functions/implementation processes of the processing module 1101 in FIG. 11, and the transceiver 303*a* in the first access network device 30*a* shown in FIG. 4 may implement functions/implementation processes of the transceiver module 1102 in FIG. 11.

The communication apparatus 110 provided in this embodiment can perform the foregoing communication method. Therefore, for technical effects that can be achieved by the communication apparatus 110, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read and write interface circuit, and the interface circuit is configured to: receive computer-executable instructions (where the computer-executable instructions are stored in a memory, and may be directly read from the memory or may be read through another component), and transmit the computer-executable instructions to the processor. When the communication apparatus is a chip system, the communication device may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. In embodiments of this application, the computer may include the apparatuses described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method comprises:
   determining that a connection failure occurs;
   in response to determining that the connection failure occurs, recording a first report, wherein the first report comprises a public land mobile network (PLMN) identifier of a failed logical cell and cell information of a second logical cell, wherein the failed logical cell is a cell in which the connection failure occurs, the second logical cell is a cell that has a different PLMN than the failed logical cell and that the failed logical cell; and
   sending the first report to a third access network device that is different from a first access network device associated with a source logical cell and that is different from a second access network device associated with the failed logical cell.

2. The method according to claim 1, wherein the cell information comprises a PLMN identifier and cell identifier information, and the cell identifier information identifies a cell.

3. The method according to claim 1, wherein the source logical cell is a logical cell in which a terminal device is located when the terminal device last receives a handover command.

4. The method according to claim 1, wherein the connection failure is a radio link failure (RLF), and the failed logical cell is a logical cell in which the RLF is detected.

5. The method according to claim 1, wherein the connection failure is a handover failure (HOF), and the failed logical cell is a target logical cell in which the HOF occurs.

6. The method according to claim 1, wherein the first report further comprises cell identifier information of the failed logical cell.

7. The method according to claim 1, wherein the first report comprises a PLMN identifier of the source logical cell, the method further comprises:
   receiving first indication information, wherein the first indication information indicates a terminal device to record cell information or the PLMN identifier of the source logical cell; and
   the recording a first report comprises:
   recording the first report based on the first indication information.

8. The method according to claim 1, wherein the method further comprises:
   receiving second indication information, wherein the second indication information indicates a terminal device to record cell information or the PLMN identifier of the failed logical cell; and
   the recording a first report comprises:
   recording the first report based on the second indication information.

9. A communication method, wherein the method comprises:
   receiving, at a third access network device that is different from a first access network device associated with a source logical cell and that is different from a second access network device associated with a failed logical cell, a first report, wherein the first report comprises a public land mobile network (PLMN) identifier of the failed logical cell and cell information of a second logical cell, wherein the failed logical cell is a cell in which a connection failure occurs, the second logical cell is a cell that has a different PLMN than the failed logical cell and that shares a same physical cell with the failed logical cell; and processing the first report.

10. The method according to claim 9, wherein the cell information comprises a PLMN identifier and cell identifier information, and the cell identifier information identifies a cell.

11. The method according to claim 9, wherein the source logical cell is a logical cell in which a terminal device is located when the terminal device last receives a handover command.

12. The method according to claim 9, wherein the connection failure is a radio link failure (RLF), and the failed logical cell is a logical cell in which the RLF is detected.

13. The method according to claim 9, wherein the connection failure is a handover failure (HOF), and the failed logical cell is a target logical cell in which the HOF occurs.

14. The method according to claim 9, wherein the method comprises:

obtaining indication information, wherein the indication information comprises at least one of first indication information or second indication information, the first indication information indicates a terminal device to record cell information or a the PLMN identifier of the source logical cell when the connection failure occurs, and the second indication information indicates the terminal device to record cell information or the PLMN identifier of the failed logical cell in which the connection failure occurs; and sending the indication information.

15. The method according to claim 14, wherein when the indication information comprises the second indication information, and the indication information is obtained by the first access network device, the obtaining indication information comprises:

receiving the second indication information from the second access network device.

16. A communication apparatus, comprising:

at least one processor; and one or more memories coupled to the at least one processor and storing programming instructions for execution by the at least one processor to cause the apparatus to:

determine that a connection failure occurs;

in response to determining that the connection failure occurs, record a first report, wherein the first report comprises a public land mobile network (PLMN) identifier of a failed logical cell and cell information of a second logical cell, wherein the failed logical cell is a cell in which the connection failure occurs, the second logical cell is a cell that has a different PLMN than the failed logical cell and that shares a same physical cell with the failed logical cell; and send the first report to a third access network device that is different from a first access network device associated with a source logical cell and that is different from a second access network device associated with the failed logical cell.

17. The apparatus according to claim 16, wherein the cell information comprises a PLMN identifier and cell identifier information, and the cell identifier information identifies a cell.

18. The apparatus according to claim 16, wherein the source logical cell is a logical cell in which a terminal device is located when the terminal device last receives a handover command.

19. The apparatus according to claim 16, wherein the first report comprises a PLMN identifier of the source logical cell, the programming instructions, when executed by the at least one processor, cause the apparatus to:

receive first indication information, wherein the first indication information indicates a terminal device to record cell information or a PLMN identifier of the source logical cell; and record the first report based on the first indication information.

20. The apparatus according to claim 16, wherein the programming instructions, when executed by the at least one processor, cause the apparatus to:

receive second indication information, wherein the second indication information indicates a terminal device to record cell information or the PLMN identifier of the failed logical cell; and record the first report based on the second indication information.

* * * * *